(12) United States Patent
Ramu

(10) Patent No.: US 8,878,467 B2
(45) Date of Patent: Nov. 4, 2014

(54) POWER FACTOR CORRECTION DRIVE CIRCUIT TOPOLOGIES AND CONTROL FOR SWITCHED RELUCTANCE MACHINES

(71) Applicant: Krishnan Ramu, Blacksburg, VA (US)

(72) Inventor: Krishnan Ramu, Blacksburg, VA (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 13/959,334

(22) Filed: Aug. 5, 2013

(65) Prior Publication Data

US 2014/0035490 A1 Feb. 6, 2014

Related U.S. Application Data

(62) Division of application No. 13/074,628, filed on Mar. 29, 2011, now Pat. No. 8,525,450.

(60) Provisional application No. 61/318,506, filed on Mar. 29, 2010.

(51) Int. Cl.
*H02P 25/08* (2006.01)
*H02K 1/14* (2006.01)
*H02K 3/18* (2006.01)
*H02P 6/14* (2006.01)

(52) U.S. Cl.
CPC .. *H02P 6/14* (2013.01); *H02K 1/14* (2013.01); *H02K 3/18* (2013.01); *H02K 2213/03* (2013.01)
USPC .............. 318/254.1; 318/254.2; 318/701; 318/438

(58) Field of Classification Search
USPC ............ 318/254.1, 254.2, 701, 729, 438; 310/49.43, 216.075, 216.107, 12.18
See application file for complete search history.

(56) References Cited

U.S. PATENT DOCUMENTS

| | | | |
|---|---|---|---|
| 5,115,181 A | 5/1992 | Sood | |
| 5,327,069 A * | 7/1994 | Radun et al. | 322/10 |
| 5,500,579 A * | 3/1996 | Kim et al. | 318/493 |
| 5,563,487 A * | 10/1996 | Davis | 318/701 |
| 5,627,444 A | 5/1997 | Fulks | |
| 5,703,456 A | 12/1997 | Cox | |
| 5,811,905 A | 9/1998 | Tang | |
| 5,814,965 A | 9/1998 | Randall | |
| 5,821,723 A * | 10/1998 | Kim | 318/701 |
| 6,037,740 A | 3/2000 | Pollock et al. | |
| 6,166,500 A * | 12/2000 | Makaran | 318/400.22 |
| 7,271,564 B2 | 9/2007 | Ramu | |

(Continued)

FOREIGN PATENT DOCUMENTS

WO   WO 2009/023205 A1   2/2009

OTHER PUBLICATIONS

U.S. Appl. No. 60/955,661, filed Aug. 14, 2007, Ramu.

(Continued)

*Primary Examiner* — Bentsu Ro
*Assistant Examiner* — Thai Dinh
(74) *Attorney, Agent, or Firm* — Armstrong Teasdale LLP

(57) ABSTRACT

Drive circuits that provide power factor correction and input current waveform shaping for controlling the speed and torque in a switched reluctance machine (SRM). The machine's phase windings are split into two segments, one of which is used for active power factor correction, input ac current waveform shaping and partial torque generation and the other of which is used for torque generation.

24 Claims, 21 Drawing Sheets

(56) References Cited

U.S. PATENT DOCUMENTS

| | | | |
|---|---|---|---|
| 7,372,232 B2 * | 5/2008 | Ramu | 318/700 |
| 7,412,339 B2 | 8/2008 | Ramu et al. | |
| 7,902,787 B2 | 3/2011 | Ahn et al. | |
| 8,228,021 B2 * | 7/2012 | Cheung et al. | 318/800 |
| 8,264,182 B2 | 9/2012 | Ramu | |
| 8,525,450 B2 * | 9/2013 | Ramu | 318/254.1 |
| 2002/0153858 A1 | 10/2002 | Schulz et al. | |
| 2005/0072608 A1 | 4/2005 | Johnston et al. | |
| 2008/0186748 A1 | 8/2008 | Cuellar et al. | |
| 2009/0045768 A1 * | 2/2009 | Ramu | 318/701 |
| 2009/0153095 A1 | 6/2009 | Ahn et al. | |
| 2011/0187300 A1 | 8/2011 | Ramu | |
| 2012/0169267 A1 | 7/2012 | Nashiki et al. | |
| 2012/0176084 A1 | 7/2012 | Klaes | |

OTHER PUBLICATIONS

International Search Report issued Aug. 10, 2011 in International Application No. PCT/US2011/0300327.

Written Opinion of the International Searching Authority issued Aug. 10, 2011 in International Application No. PCT/US2011/0300327.

* cited by examiner

POWER FACTOR CORRECTION DRIVE CIRCUIT TOPOLOGIES AND CONTROL FOR SWITCHED RELUCTANCE MACHINES

RELATED APPLICATIONS

This application is a Divisional application of U.S. application Ser. No. 13/074,628 filed Mar. 29, 2011, which is a Non-Provisional application of U.S. Provisional Application 61/318,506 filed Mar. 29, 2010, the disclosures of which are incorporated herein by reference in their entireties.

BACKGROUND OF THE RELATED ART

Power factor is defined as the cosine of the phase angle between the instantaneous alternating current (ac) voltage and current considering only the fundamental values of the ac voltages and currents. Unity power factor is achieved when the phase angle between the voltage and current is zero. It is desired to have unity power factor when drawing power from the utility so that only real power is drawn from the utility and no reactive power is drawn from the utility by. The investment on the generating and distribution equipments from the utility side will be minimized when only real power, having a power factor of unity, is drawn from the utility.

Power converts having rectifiers distort ac current from the utility supply, leading to non-sinusoidal current waveforms that introduce harmonics other than the fundamental that are undesirable in the operation of the utility. Additionally, these harmonics contribute to additional losses that do not exist when only sinusoidal currents are being drawn from the utility. Therefore, power factor correction and input current waveform shaping are of importance in motor drives applications, because of regulations and incentives from utilities to encourage users to build unity power factor operation into their systems so as to draw sinusoidal current from the utility. Common ways to incorporate these features are: (1) to add a separate unity power factor (UPF) correction circuit, which is an expensive approach and takes additional space and volume for installation, and (ii) to reuse a full-bridge controlled rectifier operating in a boost mode, which is an expensive solution.

A solution was patented by Krishnan Ramu (U.S. Pat. No. 7,271,564, Issued: Sep. 18, 2007) which addresses these challenges with a single transistor for a two phase machine. There are distinct disadvantages associated with the single-transistor power converter. One disadvantage is the limited torque generating region for a two phase machine. When phase A is conducting, phase B has to conduct, too. The torque production of these two phases are usually of opposite polarity most of the time. Therefore, the net torque production in such a circuit with two phase windings will have reduced output. A reduced torque outcome can be proven easily by looking at the instantaneous torque generation in two phases of the SRM.

An exception can be made such that that the currents in the two phases is unequal, so the torque contributions from the two phases are unequal in magnitude. The net torque is still reduced when the currents in the phases are unequal. Moreover, the reduced or smaller torque is produced in every alternate torque generation region of either phase A or B, whichever can produce the maximum torque compared to the other phase. Assume phase B has less winding turns and phase A has more turns. The unequal number of turns between the phases makes phase B the auxiliary phase, with smaller torque generating capability compared to phase A. Therefore, $T_{ea}$-$T_{eb}$, where $T_{ea}$ and $T_{eb}$ are the torque due to phase A and phase B of the SRM, is positive when phase A's torque generation region is positive. This net positive torque comes every alternate phase cycle thus average torque produced is halved, resulting in smaller torque output.

A circuit with two switches and two diodes per phase requires external boost inductors for each phase to address the problem of power factor correction. The external inductors are expensive, they require additional space in the motor drive system, and they require additional cooling to dissipate core and resistive winding losses. Most importantly, these external inductors receive current from the ac side but do not produce any useful torque, as they are not part of the electromagnetic system inside the SRM. The lack of useful torque provided by the external inductors is the biggest negative of the circuit and its operation.

SUMMARY OF THE INVENTION

An object of the invention is to address the above-described short-comings of the related art by employing split windings in a switched reluctance machine (SRM) that form part of the power factor correction circuit.

In accordance with the exemplary embodiment of the present invention an SRM is provided that comprises a stator having plurality of poles each of which has its concentric winding that are connected amongst themselves in a manner to achieve a required number of machine phases and a rotor having a plurality of poles with neither windings nor permanent magnets on the rotor poles. An electronic power converter that is capable of controlling the power flow to the SRM phase windings with one transistor per phase winding that requires split of a phase winding in to two parts, that are not necessarily equal but can be equal if desired. These two parts of the phase winding enable power flow through the power converter with the transistor and diodes. One part, called first part, of the phase winding allows flow of power from the ac input supply with sinusoidal part currents thus contributing to a varying input power to a part of the machine output. The other part, called second part, of the same phase winding allows the flow of power from a dc capacitor charged previously from the ac supply thus providing a constant power flow to this part of the winding or it can be modulated to provide a varying power input to the machine such that the varying input power to the first part of the machine phase in combination with the varying part of the second part of the machine phase can result in constant power input. An electronic power converter is the object of invention which allows for the split phase windings to be connected with only one transistor per phase to supply power to both parts of the phase winding and in the process control the input power factor on the ac supply input side. Control strategies to realize the power factor control on the ac supply input side drawing part of full sinusoidal current on the ac supply input side while simultaneously maintaining the required power and torque output in the SRM is another object of the invention with the electronic power converter invention. The object of the invention is to regulate the air gap power while maintaining the speed command enforced using air gap power feedback control and similarly enforce torque control with torque feedback control with the power electronic converter operating on a SRM in the invention. Further object of the invention is to make the air gap power control insensitive to parameter variations such as resistive losses to work with the invention power electronic converter and the SRM. The power electronic converter invention is further modified to have only one dc capacitor instead of two capacitors for compactness and low cost implementation and that is another object of the invention. Split phase windings with a two transistors per phase configuration in the invention allows for another object of invention of both power factor control at the input ac supply side and providing for continuous power control of the entire phase winding. Modifications of the invention with one transistor per part of the phase winding to a total of three transistors for the four parts phase windings of the two phase SRM are the objects of the invention to provide a class of power factor correcting SRM drives with different performance characteristics to cater to various applications that may arise in the market. Further object of the invention is an electronic power converter circuit to work with split phase windings and a small capacitor and only transistor and one diode per phase of the machine winding to provide power factor control at the input ac supply side, allowing to draw sinusoidal current on the ac supply input side while simultaneously providing torque and power control to the SRM without using any external inductors or additional devices to achieve the same. A further object of the invention is to have a SRM with windings that can be part of the phase windings and that can be placed on the back iron of the stator lamination stack of the SRM. Further object of the invention is that these windings placed on the back iron of the SRM stator will produce flux that can be additive or subtractive to the fluxes engendered by the winding on the stator poles.

DETAILED DESCRIPTION OF THE INVENTION

Figure 1:
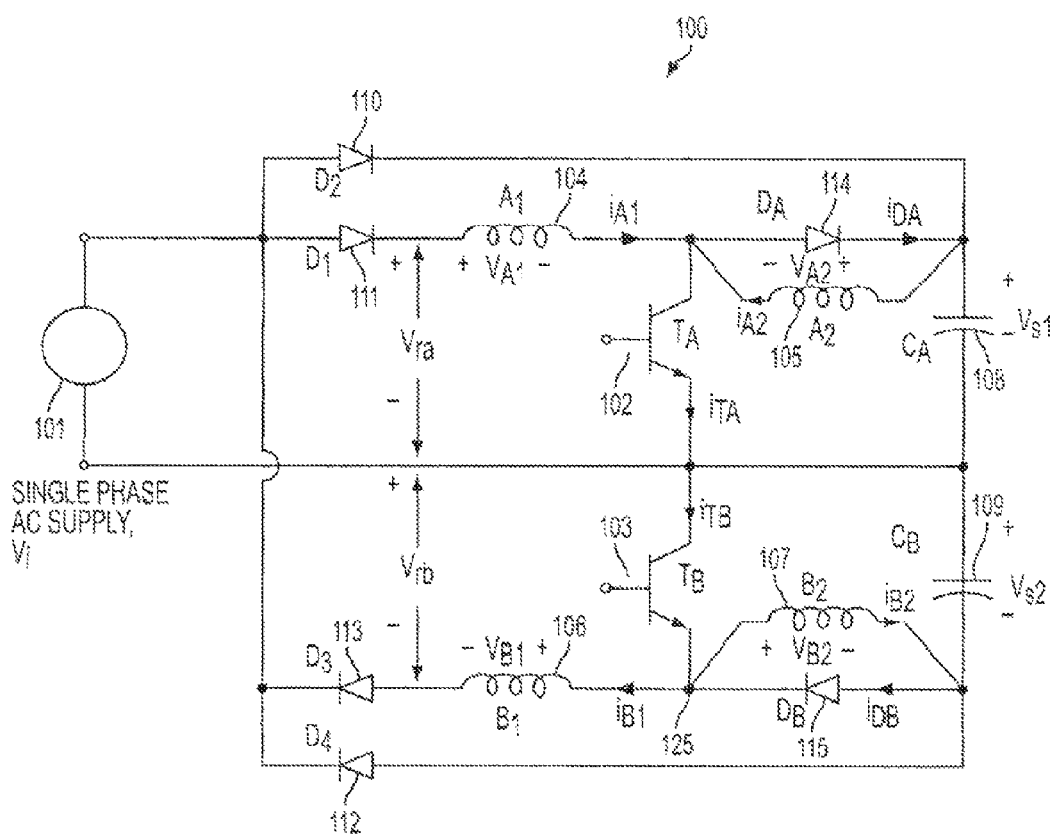
FIG. 1 illustrates a single switch per phase converter without a full diode bridge rectifier for a two phase SRM.

FIG. 1 illustrates a single switch per phase power converter 100 for a two phase SRM. Power converter 100 has one transistor for each phase, each phase comprising two coils. Consider a two phase SRM with phases A and B having exact equivalency in windings. Each phase has multiple coils. For illustration consider them having two coils per phase, i.e. $A_1$ 104 and $A_2$ 105 for phase A and $B_1$ 106 and $B_2$ 107 for phase B. Note that $A_1$ 104 and $A_2$ 105 and likewise B1 106 and B2 107 need not have equal number of turns but $A_1$ 104 and B1 106 and $A_2$ 105 and $B_2$ 107 are assumed to have equal number of turns to optimize the output torque. Many phase coil arrangement techniques are possible for realizing the SRM. U.S. Provisional Patent Application Ser. No. 60/955,661 by the same inventor Krishnan Ramu titled Power Factor Correction for Switched Reluctance Machines describes SRM winding configurations in FIG. 3, FIG. 4, and FIG. 6 that are suitable for power factor correction drive circuit 100. Transistor $T_A$ 102 drive phase A and transistor $T_B$ 103 drives phase B.

Consider the operation of the circuit associated with phase A winding coils $A_1$ 104 and $A_2$ 105. At the start of the circuit operation and immediately after energization of the circuit, capacitor $C_A$ 108 is charged in the positive cycle of input alternating current (ac) voltage 101 and $C_B$ 109 is charged to peak of input ac voltage 101 $v_i$ during negative half cycle of input ac voltage 101 application. Capacitor $C_A$ 108 is charged through diode $D_2$ 110. Diode $D_2$ 110 ensures that voltage across $C_A$ 108, $V_{s1}$, is maintained to some level to supply winding $A_2$ 105 when ac input voltage $v_i$ 101 is having a negative half cycle, with $D_1$ 111 reversed biased as a result. The presence of diode $D_2$ 110 makes such a difference from previous art in connection with SRM drive in that it provides a path for energy input to $A_2$ 105. Coil $A_2$ 105 is assured of energy input when so desired and when energy becomes unavailable from ac supply during negative half-cycles for phase A (and likewise for positive half-cycles for phase B overcome by $D_4$ 114). The addition of diode $D_2$ 110 removes one of the major drawbacks of the power factor correction circuits in U.S. Provisional Patent Application Ser. No. 60/955,661. With the charging of capacitor $C_A$ 108, voltage $V_{s1}$ can be assumed to be a constant and remains so on average during the operation of the circuit.

Assume voltage $v_{ra}$ is positive and phase A is in a region when excited that will produce a positive or motoring torque. Turning on the gate signal of transistor $T_A$ 102 will apply a voltage $v_{ra}$ on winding $A_1$ 104, enabling a current $i_{A1}$ in it. At the same time, a voltage $V_{s1}$ is applied across coil $A_2$ 105 initiating a current $i_{A2}$ in it. Transistor $T_A$ 102 carries both the currents $i_{A1}$ and $i_{A2}$ and $$i_{TA}=i_{A1}+i_{A2} \tag{1}$$

The current in $A_1$ 104 is programmed to be sinusoidal. The sinusoidal current can be realized through either hysteresis or pulse width modulation (PWM) control. Considering hysteresis current control for illustration here, transistor $T_A$ 102 is turned off when the current in coil $A_1$ 104 exceeds its command value (reference value) $i^*_{A1}$ by the hysteresis window $\Delta i$.

The switching logic then is, $$\text{If } (i_{A1} - i^*_{A1}) \geq \Delta i, \text{ turn off } T_A \quad (2)$$

$$\text{If } (i_{A1} - i^*_{A1}) \leq \Delta i, \text{ turn on } T_A \quad (3)$$

Under condition (2), i.e., when $T_A$ 102 is turned off, current $i_{A1}$ is diverted through $D_A$ 114 to capacitor $C_A$ 108, thus charging it. At the same time, the current in coil $A_2$ 105 is also rerouted through $D_2$ 110 and back to $A_2$ 105 with the result that the applied voltages across $A_1$ 104 and $A_2$ 105 are:

$$v_{A1} = v_{ra} - v_{s1} \quad (4)$$

$$v_{A2} = 0 \quad (5)$$

And the currents in transistor $T_A$ 102 and diodes $D_1$ 111 and $D_A$ 114 when $T_A$ 102 is turned off are, $$i_{DA} = (i_{A2} + i_{A1}) \quad (6)$$

$$i_{D1} = i_{A1} \quad (7)$$

$$i_{TA} = 0 \quad (8)$$

Turning on and off transistor $T_A$ 102 goes on in the entire phase cycle when phase A remains in the positive torque region for motoring. Before the phase can generate negative torque, transistor $T_A$ 102 is turned off for good. The current in coil $A_1$ 104 will decay fast and it is determined by the voltage $(v_{ra} - V_{s1})$ to commutate the current. The current in coil $A_2$ 105 will take longer time to decay as the current is freewheeling and zero voltage is applied across it. The substantial negative voltage in coil $A_1$ 104 is not applied to $A_2$ 105. Therefore, in order not to incur negative torque generation in $A_2$ 105 (more than in $A_1$ 104), the turning off of transistor $T_A$ 102 has to be predetermined and initiated well before the negative torque generation region starts.

Figure 2:
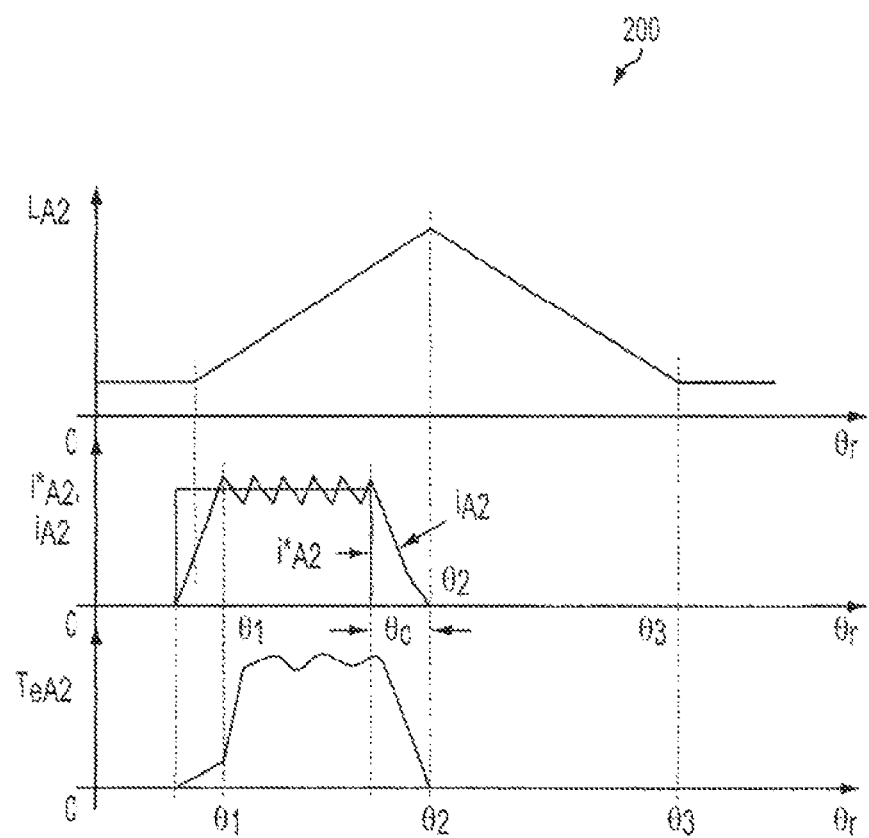
FIG. 2 illustrates the advance commutation of current in a phase winding to prevent negative torque generation.

FIG. 2 illustrates the advance commutation of current in a phase winding to prevent negative torque generation. Angle $\theta_C$ is the angle of advance commutation before current $i_{A2}$ enters a negative torque region. Between $\theta_1$ and $\theta_2$, torque produced will be positive and between $\theta_3$ and $\theta_2$, negative torque is produced when a current is present in a coil. The notations in FIG. 2 are:

$L_{A2} \rightarrow$ Inductance of coil $A_2$ 105 vs rotor position for a fixed current in it.

$T_{LA2} \rightarrow$ Electromagnetic torque generated by $A_2$ 105 when current $i_{A2}$ is present in it.

$i_{A2}, i^*_{A2} \rightarrow A_2$ 105 current and its command.

Consider $v_{ra}$ being negative, i.e., the input ac is in negative half cycle 101. When $v_{ra}$ is negative, turning on transistor $T_A$ 102 will only energize winding $A_2$ 105 with the energy stored in capacitor 108 and torque can be harvested. Note that energy required to charge capacitor $C_A$ 108 is always available through diode $D_2$ 110. Nevertheless, capacitor $C_A$ 108 has to be sized to contain energy to support coil $A_2$ 105 current during negative half cycle of the ac supply input. Circuits in U.S. Pat. No. 7,271,564 cannot energize both coils of a phase as energy in $C_A$ 108 is limited by the boost operation only. Hence, capacitor $C_A$ 108 would have a smaller energy storage, thereby crimping the torque generation of coil $A_2$ 105 during negative half cycles of ac supply input 101 to the circuit.

It should be noted that phase B operates in a similar fashion to phase A. Transistor $T_B$ 103 can draw current from the ac supply 101 to energize $B_1$ 106 only when $v_{rb}$ is positive. When $v_{rb}$ is negative, energy stored in capacitor $C_B$ 109 is used to energize coil $B_2$ 107, and diode $D_3$ 113 is reverse biased. Diode $D_4$ 112 charges $C_b$ 109 during the negative half cycle of ac supply 101.

Control of Current in Phase A:

Based on the understanding of circuit 100 in FIG. 1 developed in the description above, the control of phase A is derived in the following. The objective of the control system is to get the maximum torque out of phase with one or both of its coils working. The coils in a phase may work depending on the positive or negative half cycles of ac supply 101.

Figure 3:
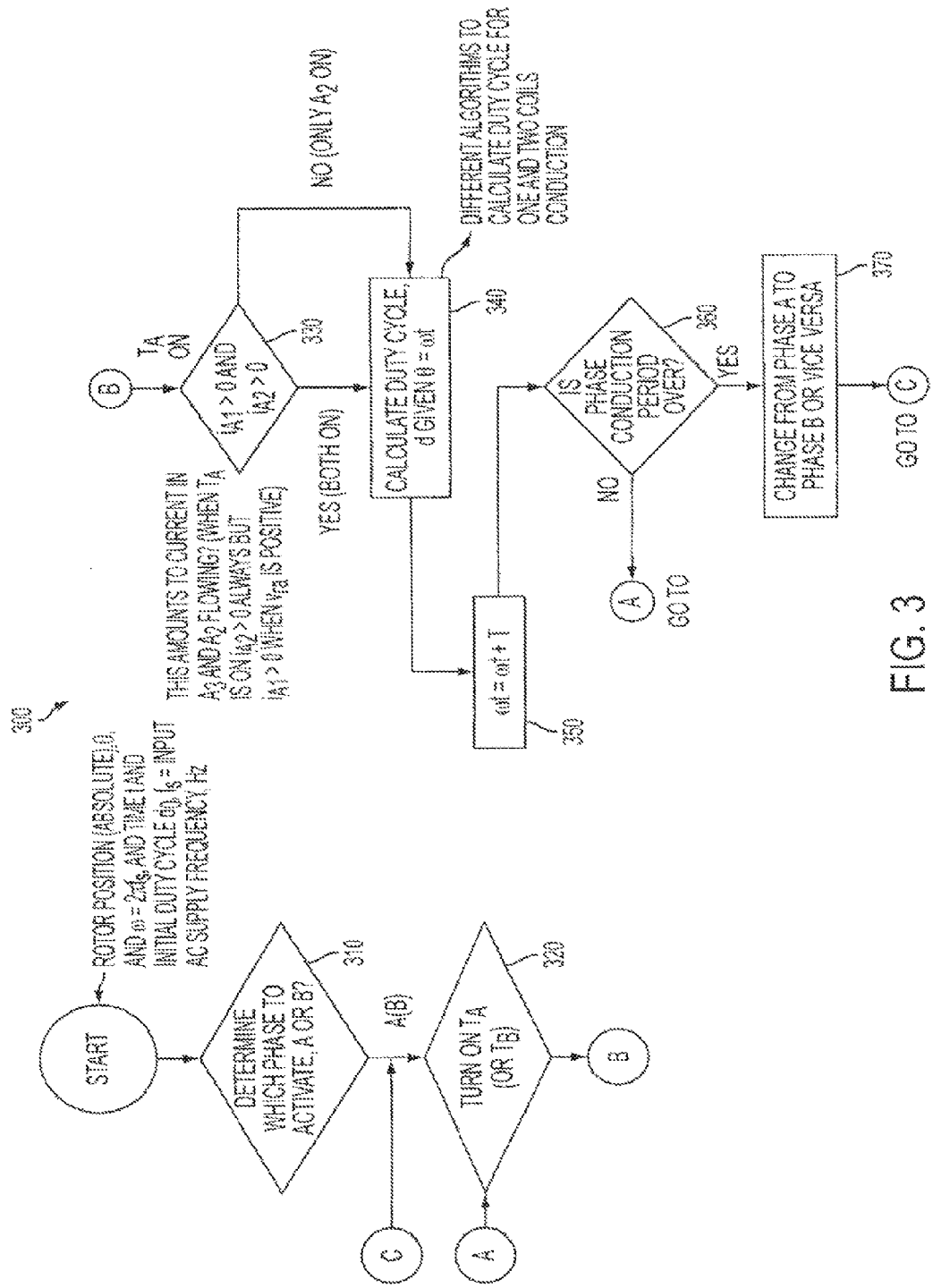
FIG. 3 illustrates a flow chart for control of the SRM of FIG. 1.

FIG. 3 illustrates a flow chart 300 for control of the SRM of FIG. 1. Suppose phase A is selected for activation within decision block 310. Phase A is activated with a small initial duty cycle $d_0$ by switching on the appropriate transistor in block 320. The coil currents $i_{A1}$ and $i_{A2}$ are measured according to block 330. If both coil currents are greater than zero, then use one algorithm to determine the duty cycle as per block 340 based on a torque command. If only coil $A_2$ 105 has current because the ac input is going through a negative half cycle and $i_{A1} = 0$, then use a different algorithm to determine the duty cycle. After the duty cycle is determined, update the time with the PWM period T 350 and see whether the phase conduction period is over or not block 340. If the conduction period is over, proceed to 370 and change the control of phase B. If phase B's activation has to be advanced, even before phase A's conduction period is over, it can be simply done by calculating the onset of phase B based on $\omega t$ and then a branching can be done. The variable $\omega$ is the speed of the motor and variable t is the current time.

Figure 4:
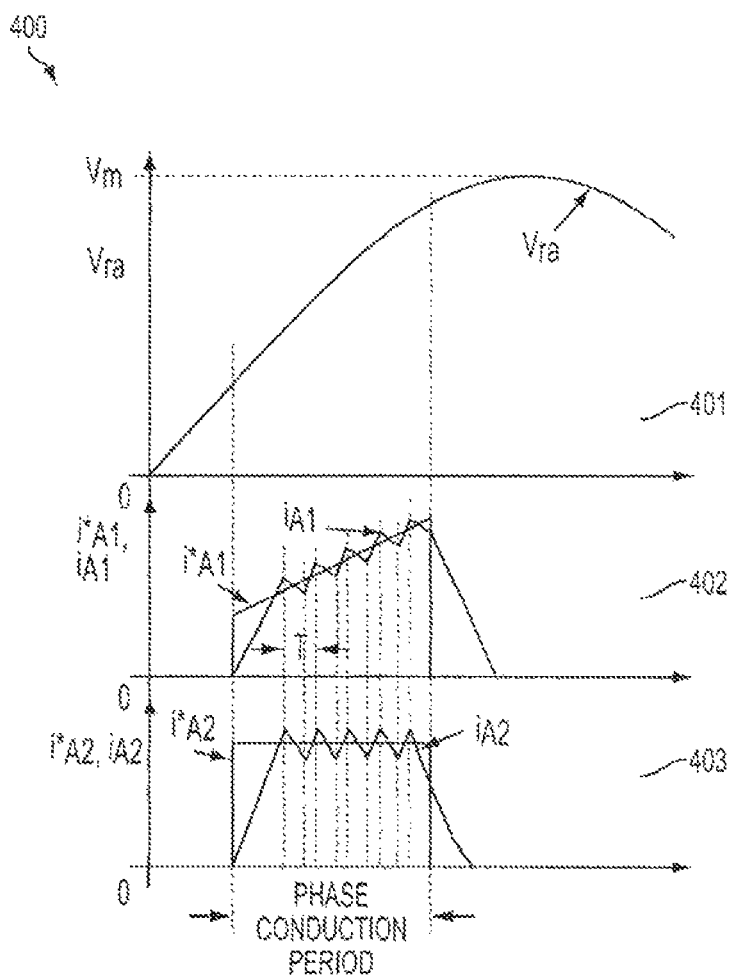
FIG. 4 illustrates phase A currents with both coils having currents.

FIG. 4 illustrates 400 phase A currents with both coils having currents. The current in coil $A_1$ 104 is piece-wise sinusoidal 402, and in coil $A_2$ 105 it is rectangular with switching current ripples superimposed 403. The current reference for coil $A_1$ 104 has to follow a sinusoidal shape to make the ac supply current sinusoidal. The current reference for coil $A_2$ 105 will be more or less flat and rectangular in shape. The torque reference, $T^*_e$, is usually apportioned to the coil $A_1$ 104 and $A_2$ 105 torque reference, viz., $T_{e1}$ and $T_{e2}$, respectively and given by $$T^*_e = T^*_{e1} + T^*_{e2} \quad (9)$$

Figure 5:
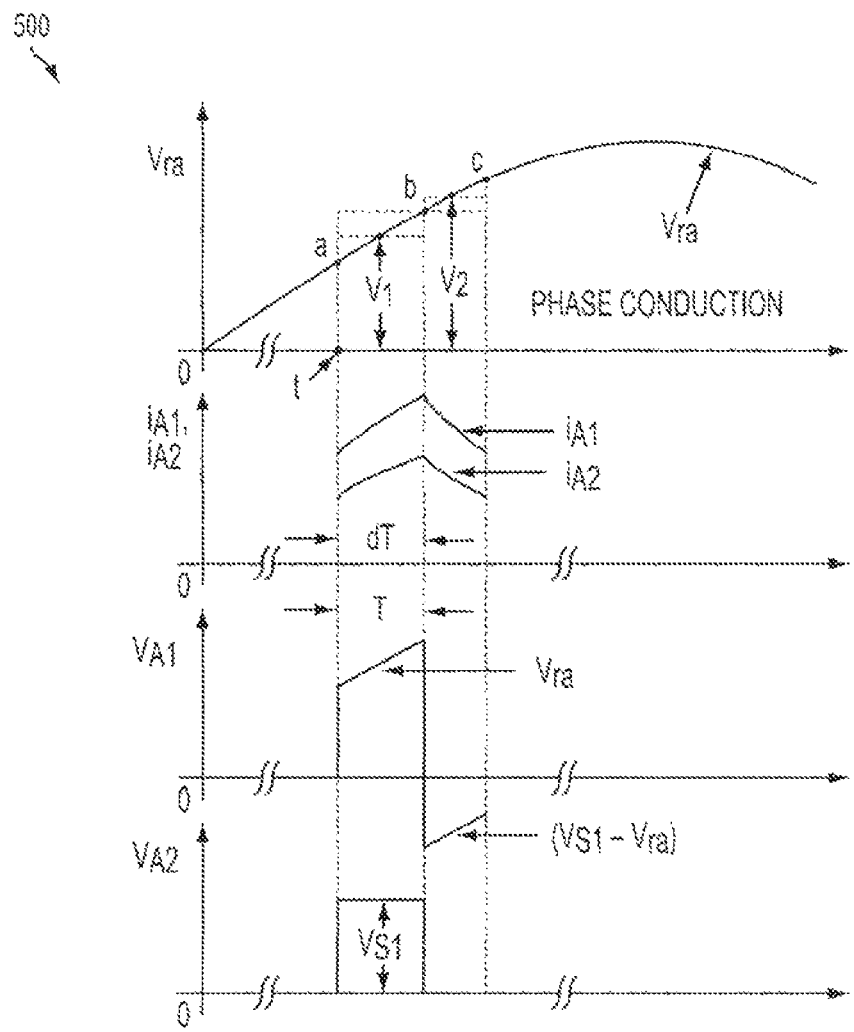
FIG. 5 illustrates phase A currents and voltages during one PWM cycle.

The key to apportioning torque and calculating the duty cycle of transistor $T_A$ 105 lies in the derivations that follow. The torque in each coil is found explicitly in terms of the input voltage and duty cycle of transistor 105. Then their references become obvious. Only one PWM period is considered and the corresponding voltages applied to coils $A_1$ 104 and $A_2$ 105 of phase A are found and plotted in FIG. 5 500 {from equations (4) and (5)}.

In the equations that follow, $\lambda_1$ is the flux linkage of $A_1$ 105, $V_m$ is the peak voltage of ac supply 101, and d is the duty cycle of $T_A$ 102. Assuming $V_{s1}$ is a constant, the flux linkage of coil $A_1$ 104 is written as:

$$\lambda_1(t+T) = \int V_{A1} dt + \lambda_1(t) \quad (10)$$

$$= \int_t^{t+dt} V_m \sin(\omega t) dt +$$

$$\int_{t+dt}^{t+T} -[v_{s1} - V_m \sin(\omega t)] dt + \lambda_1(0)$$

But $$\int_t^{t+dt} V_m \sin(\omega t) dt \approx dT \left\{ \frac{V_m \sin(\omega t) + \sin(\overline{\omega t + dT})}{2} \right\} \quad (11)$$

$$\approx dT \cdot V_m \sin(\omega t)$$

assuming $dT \ll t$
likewise, $$\int_{t+dt}^{t+T} -(v_{s1}-v_m\sin(\omega t))dt = -v_{s1}(1-d)T+(1-d)TV_m$$
$$\sin(\omega t+dT) \approx (1-d)T[V_m\sin(\omega t)-(1-d)V_{s1}] \quad (12)$$

Then the flux linkage of coil $A_1$ 104 are, $$\lambda_1(t+T) = TV_m\sin(\omega t) - T(1-d)V_{s1} + \lambda_1 t \quad (13)$$

where $\lambda_1(t)$ is the initial condition of $\lambda_1$ at time t. The current in $A_1$ 104 is calculated:

$$i_{A1} = \frac{\lambda_1}{L_{A_1}} = i_1 = \frac{TV_m\sin(\omega t) - T(1-d)V_{s1} + \lambda_1(t)}{L_{A_1}(t)} \quad (14)$$

$$i_1(t+T) \approx \frac{T\{V_m\sin(\omega t) - (1-d)V_{s1}\}}{L_{A_1}(t)} + i_1 \quad (15)$$

Likewise, the flux linkages in $A_2$ 105 are:

$$\lambda_2(t+T) = \int_t^{t+dT} V_{S1}\,dt + \lambda_2(t) \quad (16)$$

$$\lambda_2(t+T) = dTV_{s1} + \lambda_2(t) \quad (17)$$

$$i_{A_2}(t+T) = i_2(t+T) = \frac{\lambda_2(t+T)}{L_{A_2}(t)} = \frac{dTV_{s1}}{L_{A_2}(t)} + i_2(t) \quad (18)$$

where $\lambda_2$ is the flux linkage of $A_2$ 105

$$\text{and where } i_2(t) = \frac{\lambda_2(t)}{L_2(t)} \quad (19)$$

The torques contributed by currents in $A_1$ 104 and $A_2$ 105 are:

$$T_{e1} = \frac{1}{2}i_1^2 \frac{dL_{A_1}(t)}{d\theta} \quad (20)$$

$$T_{e2} = \frac{1}{2}i_2^2 \frac{dL_{A_2}(t)}{d\theta} \quad (21)$$

And the total phase A torque is:

$$T_e = T_{e1} + T_{e2} \quad (22)$$
$$T_e(t+T) = \frac{1}{2}\left(\frac{dL_{A_1}(t)}{d\theta}\right)\left[\frac{T\{V_m\sin(\omega t)-(1-d)V_{S1}\}}{L_{A_1}(t)} + i_1(t)\right]^2 +$$
$$\frac{1}{2}\left(\frac{dL_{A_2}(t)}{d\theta}\right)\left[\frac{dTV_{S1}}{L_{A_2}(t)} + i_2(t)\right]^2$$

Figure 6:
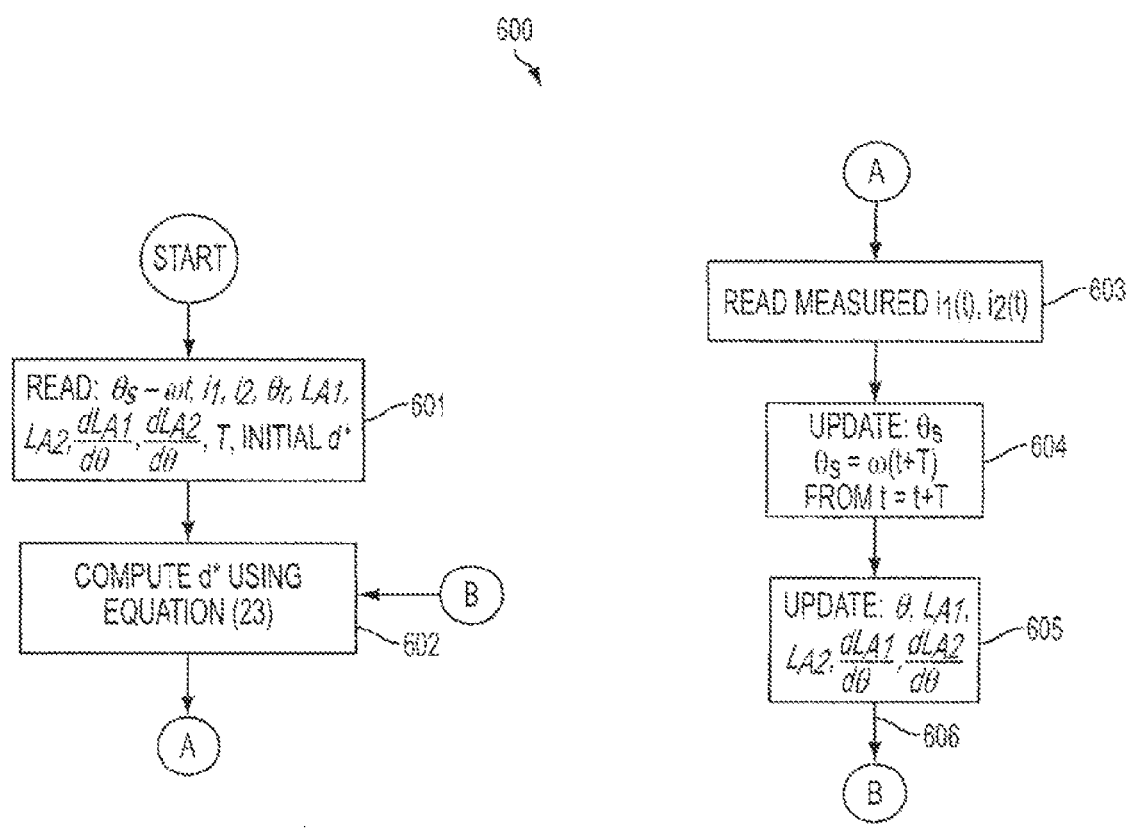
FIG. 6 illustrates the evaluation of instantaneous duty cycle reference for phase A for control system 1.

FIG. 6 illustrates the evaluation 600 of an instantaneous duty cycle reference for phase A. At the onset of phase A's energization, the initial conditions are zero for flux linkages and currents. Therefore, $i_1(t)$ and $i_2(t)$ are known as well as the inductance slopes with respect to rotor position and inductance for the given current and position. The setting of initial conditions and the determination of inductance slopes and inductances for a given current and positions are illustrated in block 601. From block 601, it is concluded that the torque is a function of duty cycle d and time, t, i.e., $\omega t = \theta_s$. Currents $i_1(t)$ and $i_2(t)$ are solved from equation (15) and (18) for every PWM cycle and substituted in (22) to yield the solution for torque in block 601.

From the torque expression in (22), reference torque for phase A can be written by assuming corresponding variables in reference form as, $$T_e^*(t+T) = \frac{1}{2}\left(\frac{dL_{A_1}(\theta,i)}{d\theta}\right)\left[\frac{T\cdot V_m\sin(\omega t)-(1-d^*)V_{S1}}{L_{A_1}(\theta,i)} + i_1(t)\right]^2 + \quad (23)$$
$$\frac{1}{2}\left(\frac{dL_{A_2}(\theta,i)}{d\theta}\right)\left[\frac{d^*T\cdot V_{S1}}{L_{A_2}(\theta,i)} + i_2(t)\right]^2$$

where d* is the duty cycle reference at time t. Therefore, given the torque reference at any time t, the duty cycle can be computed by rearranging (23), shown in 602. After the duty cycle is applied, phase A's coil currents are read for control during the next PWM cycle 603. The rotor position is updated in 604 and inductance and inductance slopes are calculated for the next PWM cycle in 605. The duty cycle d* is updated for the next PWM cycle by following the cyclical path through 606, leading to block 602.

The above system for control of the SRM with novel converter can be termed control system 1. Other control strategies are derived leading to easier computation.

Control System 2:

The parameter dependencies of control system 1 lead to computationally intensive implementations. Control system 1 may not be suitable for low cost applications. Simpler applications such as fans, require a computationally light control scheme.

Figure 7:
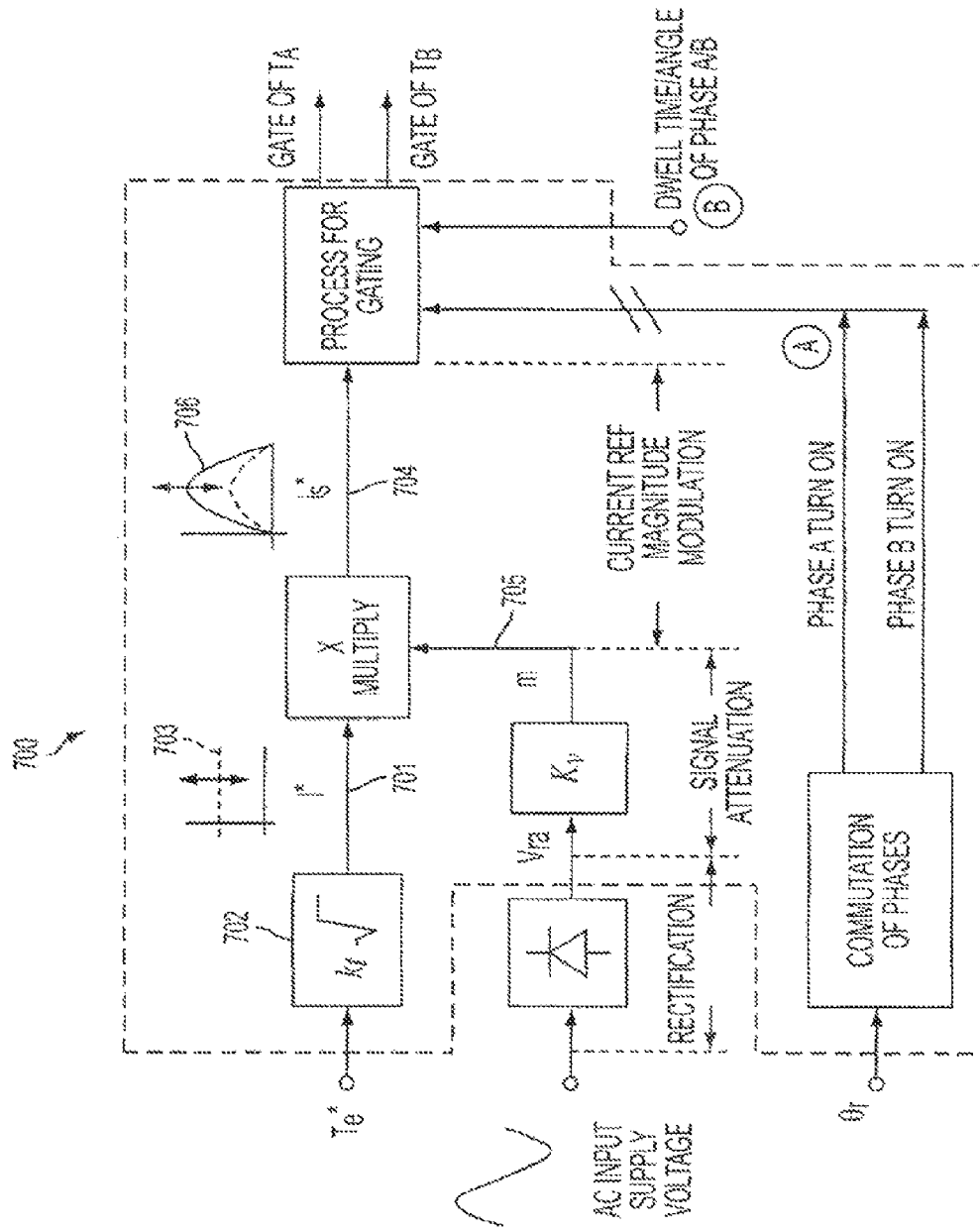
FIG. 7 illustrates schematic of control system 2.

FIG. 7 illustrates schematic 700 of control system 2. The torque command is used to derive an equivalent current command 701 with a proportional factor and square rooting function as 702:

$$I^* = (\sqrt{T^*_e})k_{it} \quad (24)$$

The factor $K_{it}$ can be formed from an experimental or a simulation based torque versus current relationship. The current command I* 701 is a dc value illustrated by 703. The current reference is then converted into an equivalent sine reference $i_s^*$ 704 by multiplying it with an attenuated rectified signal derived from the supply ac input voltage. The attenuated ac signal is sine reference 705. The shape of the equivalent sine reference is illustrated in 706. The rectified sine voltage is obtained from the main circuit variable $v_{ra}$, also. The gating signal for the transistor is developed from $i_s^*$ 704 by multiplying it with the phase enabling signal for the corresponding phase A or B. Likewise, it then can be turned off after a dwell angle, which corresponds to a dwell time of conduction for either phase given as:

$$T_{d\omega} = \frac{\theta_{d\omega}}{\omega_m} \quad (25)$$

where $T_{d\omega}$ is the dwell time of conduction, $\theta_{d\omega}$ is the dwell angle in radians (rad), and $\omega_m$ is the rotor speed in rad/sec. $\theta_{d\omega}$ is an input variable.

Figure 8:
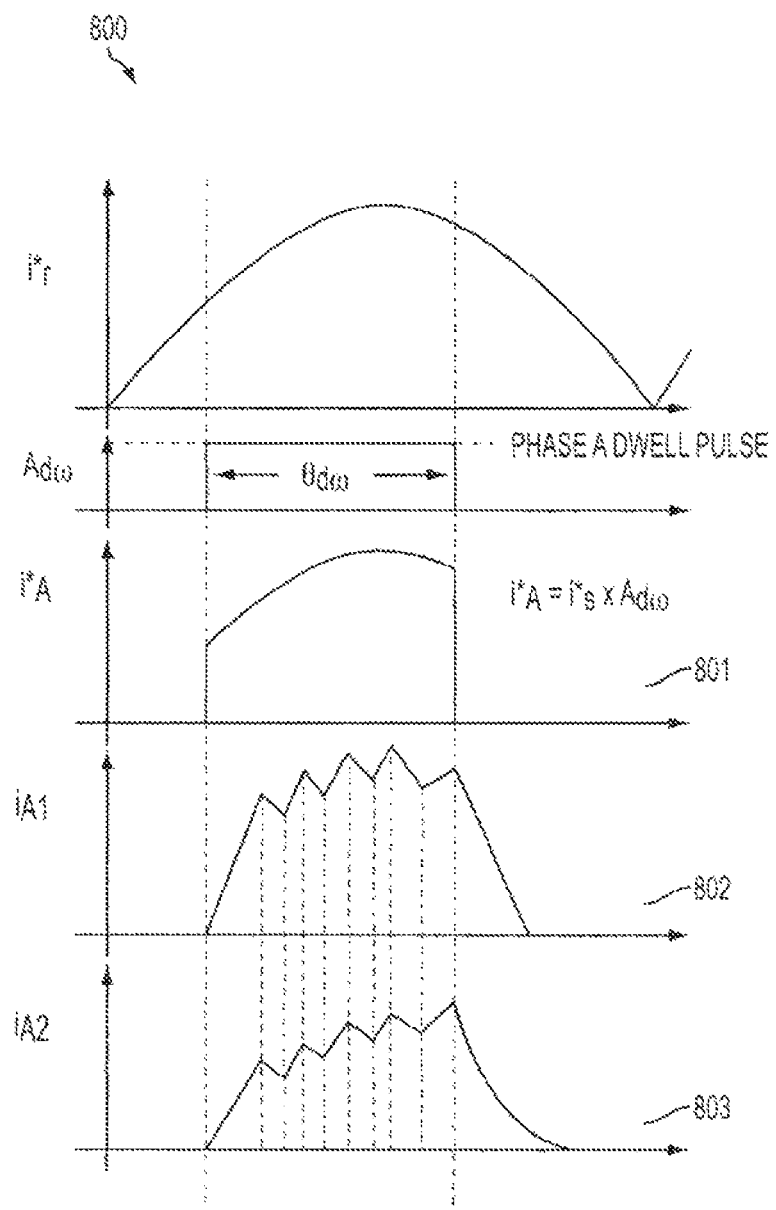
FIG. 8 illustrates gate processor action and resulting waveforms from control system 2.

FIG. 8 illustrates gate processor action and resulting waveforms from control system 2. The gating signal for phase A or B is generated in the gating process and illustrated in FIG. 8 800. The phase conduction (dwell) pulses for phases A and B are generated and conduction (dwell) pulses merge with $i_s^*$ for either time duration. $A_{d\omega}$ is the conduction pulse for phase A in 800. Then current command $i_s^*$ during that dwell interval serves to put and enforce a current in either phase.

Figure 9:
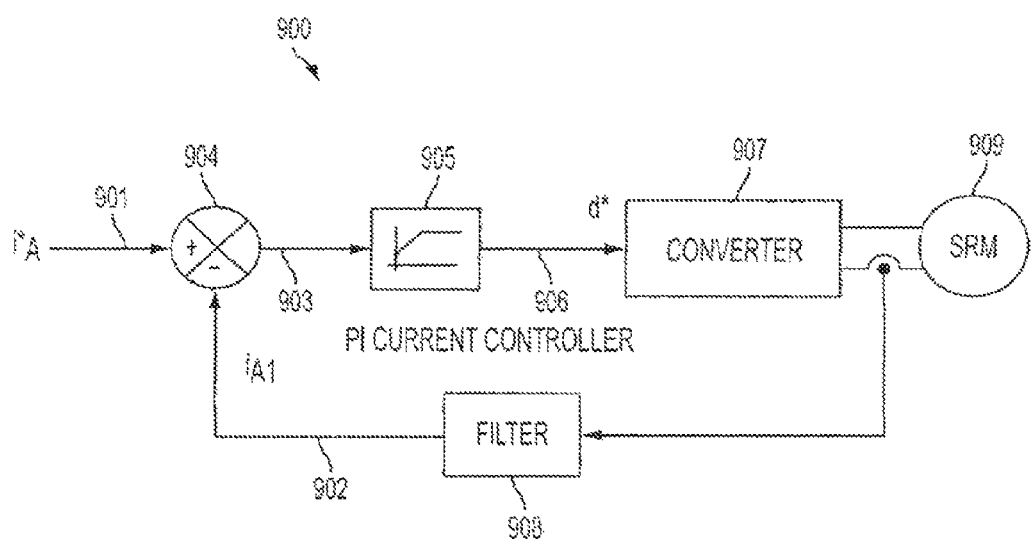
FIG. 9 illustrates the current control of phase A.

The phase conduction phase $A_{d\omega}$ can be generated from the rotor position at which the phase starts generating positive (i.e., motoring) torque through all positions in which it can keep generating the torque, which is given by the dwell angle. The dwell angle can be an external input and can be made a function of speed and, to an extent, torque request also. The phase current command $i^*_A$ can be generated by multiplying $A_{d\omega}$ and $i^*_s$ and normalizing it, as shown in 801. Current $i^*_A$ is a small segment of the sine waveform $i^*_r$ along which the phase A current has to be generated. Currents generated from phase current command $i^*_A$ 801 are generated by the phase coils $A_1$ 104 and $A_2$ 105 in graphs 802, and 803, respectively. The duty cycle for phase A is obtained by the closed loop current control as shown in FIG. 9 900. The feedback current 902 in coil $A_1$ 104 is filtered in 908 and compared to its command $i^*_A$ 901 and the error 903 calculated through 904 is amplified and conditioned by a current controller of a proportional plus integral (PI) type 905. The output of current controller 905 is the duty cycle reference for transistor $T_A$ 102 and denoted by d* 906. The duty cycle command 906 is fed to converter 907 to drive SRM 909.

Figure 10:
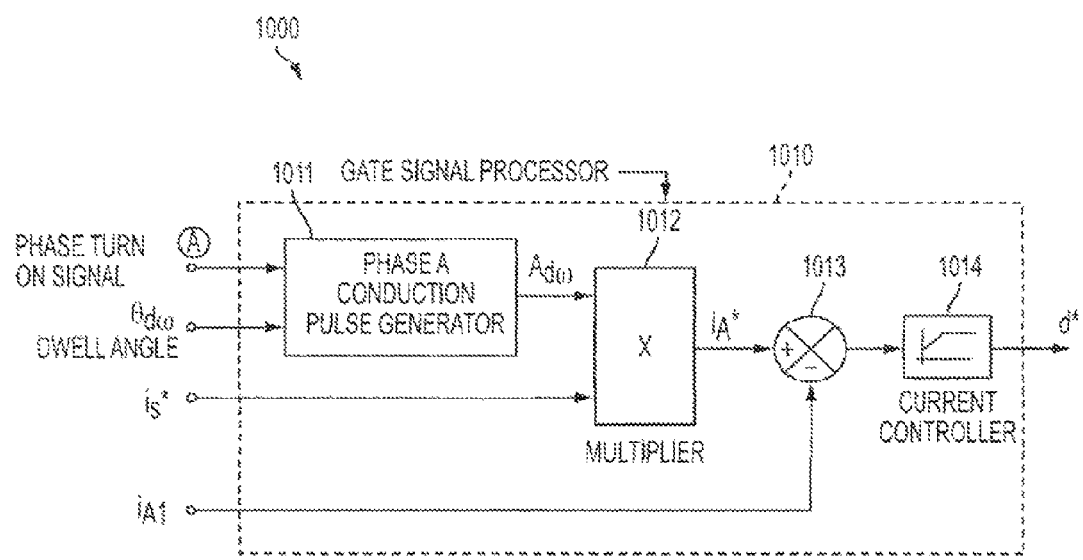
FIG. 10 illustrates gate signal processor schematic for current control illustrated in FIG. 9.

In a schematic form, the gate signal processor has the form 1000 illustrated in FIG. 10. A gate signal processor 1010 takes the phase A turn-on signal, based on whether phase A will generate positive torque or not, and the dwell angle to generate phase A's normalized conduction pulse $A_{d\omega}$ in a conduction pulse generator 1011. Conduction pulse $A_{d\omega}$ is multiplied with the current command $i_s^*$ by a multiplier 1012. The output of multiplier 1012 is phase A current command $i_A^*$. The phase current error from 1013 for coil $A_1$ 104 is fed to current controller 1014, whose output is duty cycle d* for phase A.

In control system 2, coil $A_1$ 104's current is regulated and the duty cycle determined for coil $A_2$ 104 current is applied equally to generate the current in coil $A_2$ 105. Therefore, coil $A_2$ 105 current control is slave to current control in coil $A_1$ 104. Whether the combined currents will produce the desired torque will be determined by the outer speed feedback control loop. The speed error will determine the torque command. Accordingly, the currents in phase A will be coordinated to yield the desired torque. The speed error can be sampled once in a phase conduction period so that the fluctuation in input current can be minimized Control system 2 does not involve any motor parameters such as $$L_{A_1}, \frac{dL_{A_1}}{d\theta}$$

and is insensitive to variations in phase resistances. Hence, control system 2 is easy to implement and easier to tune in the field. Also, the amount of computations for control system 2 is minimized making it attractive to use low cost processors to implement control system 2.

Figure 11:
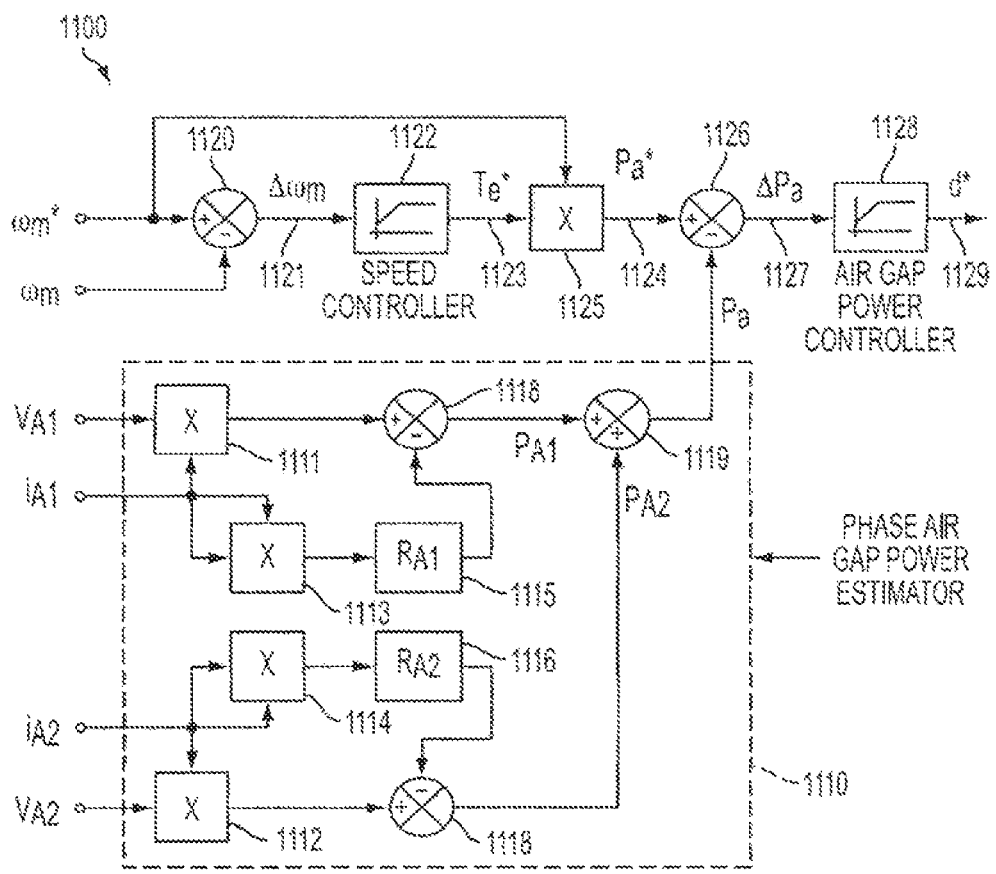
FIG. 11 illustrates the implementation block diagram for control system 3.

Control System 3:

Control system 3 neither depends on the parameters of the machine nor on the closed-loop feedback control of both phase winding currents. The implementation schematic of control system 3 1100 for one of the two phases is shown in FIG. 11. Control system 3 is based on the fact that commanded air gap power will generate an air gap power to match it. Airgap power control is enforced by a feedback control of speed and resulting air gap power feedback control. The air gap power feedback control forms the inner loop and speed feedback control forms the outer control loop. The speed control loop has a subtractor 1120 to subtract the actual machine speed from its reference to generate a speed error 1121. Speed error 1121 is amplified, conditioned, and normalized using a PI type of controller 1122 whose output is a torque command $T^*_e$ 1123. An air gap power command 1124 is generated by a multiplication 1125 of speed and torque commands.

The air gap power generated in the machine is found by the instantaneous power in each phase of the machine at a given time. It is arrived at by finding the product of current and voltage in each coil of a phase and then subtracting the resistive losses from it. To estimate phase airgap power for phase A 1110, phase voltages and currents from each coil of phase A are sampled and multiplied through multipliers 1111, 1112 to obtain the input power to both coils of phase A. Resistive losses are estimated by first taking the square of the current in each phase coil through multipliers 1113 and 1114. The squares of the coil currents aren't are scaled by their respective coil resistances in 1115 and 1116 to obtain the resistive loss in each coil of the phase. The resistive losses are subtracted from the input power to their respective phase coils through subtractors 1117 and 1118 to give the airgap power contributed from each phase coil. These airgap powers are summed in 1119 to give the total airgap power of phase A.

The difference 1126 between the airgap power command and the airgap power is an airgap power error 1127. Airgap power error 1127 is fed into an airgap power controller 1128 whose output is a duty cycle command 1129, which is fed to the power converter.

Nomenclature for FIG. 11:

$\omega^*_m$—Speed command
$\omega_m$—Speed
$\Delta\omega_m$—Speed error→$\Delta(\omega^*_m - \omega_m)$
$T^*_e$—Torque command
Symbol 'X'—Multiplier block
$P^*_a$—Airgap power command of
$P_a$—Airgap power
$\Delta P_a$—Airgap power error
$v_{A_1}, v_{A_2}$—voltages across coils $A_1$ 104 and $A_2$ 105, respectively
$i_{A_1}, i_{A_2}$—current in coils $A_1$ and $A_2$, respectively
$R_{A_1}, R_{A_2}$—resistance of coils $A_1$ 104 and $A_2$ 105, respectively
$P_{A_1}$—Air gap power of coil $A_1$ 104
$P_{A_2}$—Air gap power of coil $A_2$ 105
d*—Duty cycle command For an n-phase machine, note that 'n' number of phase airgap power estimators have to be incorporated in the block diagram. If more than one phase is contributing to torque generation at an instant, then $P_a$ consists of the air gap powers of all the phases whose phase currents are greater than zero. These are the only modifications to make to control block diagram in 1100 to make it applicable to the control of an n-phase machine control. A duty cycle 1129 command that emerges out of the airgap power controller 1128 is steered to various gating circuits of phase transistors using phase conduction periods of corresponding phases. The steering of duty cycle 1129 to various gating circuits is derived in gate signal processor schematic in FIG. 10. Usually the outgoing phase is not energized and only the incoming phase is energized in a multiphase SRM. If the conduction of both phases overlap, it is for a small time and during that small time the same duty cycle is passed on to the transistors of the two phases.

Figure 12:
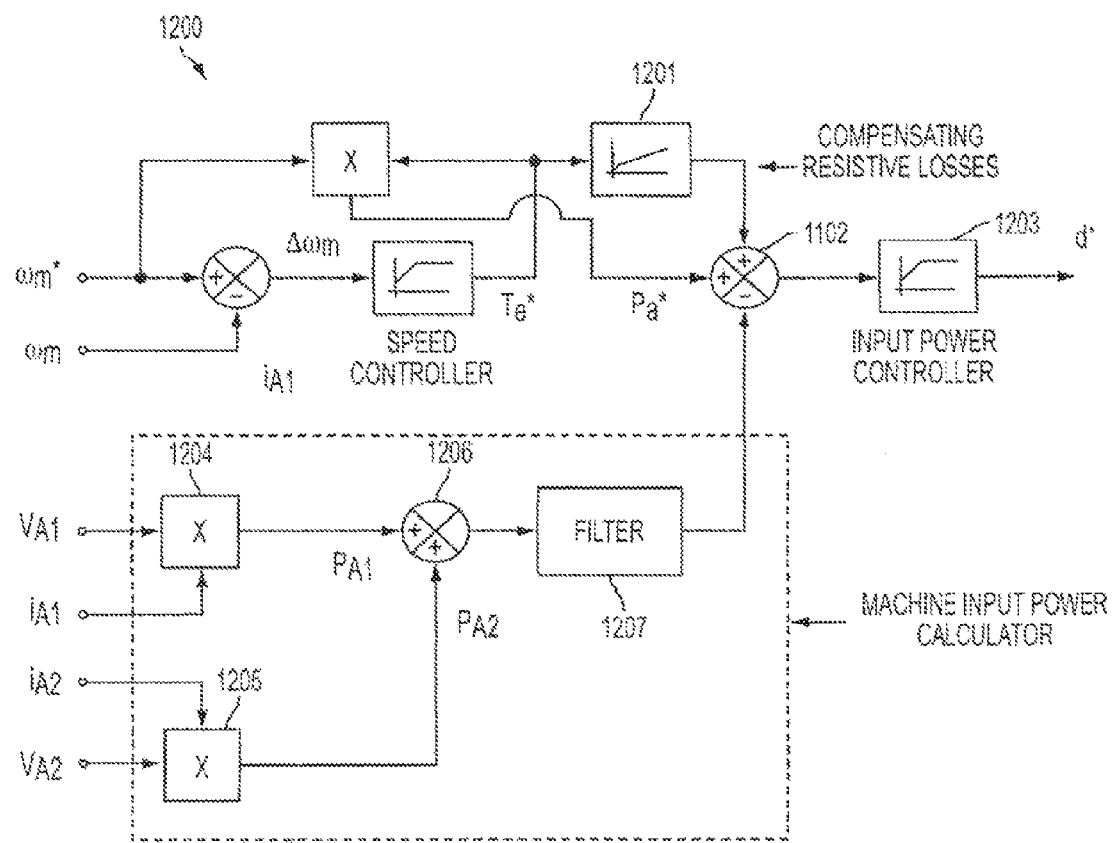
FIG. 12 illustrates the parameter insensitive implementation of control system 3.

To start and run the SRM without compensating for stator resistive losses, a feed-forward signal from the torque command can be utilized. When the feed-forward signal from the torque command is utilized, all the computations of stator resistive losses go away making the implementation simpler. Such an implementation is shown in FIG. 12 1200.

The stator resistive losses can be predetermined from simulation for a given torque request and the predetermined losses can be programmed in a look-up table 1201. The applicable loss can be recalled and added through summer 1202 with the air gap power command giving the commanded input power. The actual input power of the machine is subtracted by summer 1202 from the commanded input power to provide an error in input power which can be processed through a PI type controller, known as input power controller 1203. The actual input power to the machine is estimated by calculating the input power to each coil in a phase through multipliers 1204, 1205. The input power to each coil is summed through a summer 1206 and then conditioned through a filter 1207 to get the total phase input power. The feedback control implements the input power control as against the airgap power. Control implement in FIG. 12 1200 is free of parameters of the machine.

Implementations for control strategies 2 and 3 require sensing of phase voltages (i.e. coil voltages for each phase). It can easily be done using resistors across the coils and only part of it used for signal extraction. An alternative control system not using voltage signals is developed in the following section.

Control System 4:

Control System 4 compares a command torque and a computed torque using all currents of coils 104, 105, 106, 107 and the rotor position in a torque estimator 1320 to develop a torque error 1302. The torque error then is processed through a PI type controller, knows as a torque controller 1303. The proposed system is principally a feedback control of torque. Therefore, it will be faster and capable of excellent response. The machine torque from all phase coil currents can be computed and stored in tables 1304, 1305, 1306, 1307, which control torque due to currents in each coil of a phase. Tables 1304, 1305, 1306, 1307 each contain data of torque versus a phase coil's current and rotor position. Therefore, given a specified coil, a current and a rotor position as inputs, the table can output the torque in the specified phase coil. Tables 1304, 1305, 1306, 1307 can be developed from machine characteristics obtained either from experimental results (preferred approach) or from finite element based analysis. Then, the implementation is independent of explicit machine parameters and only depends on machine currents, thus simplifying the implementation.

Figure 13:
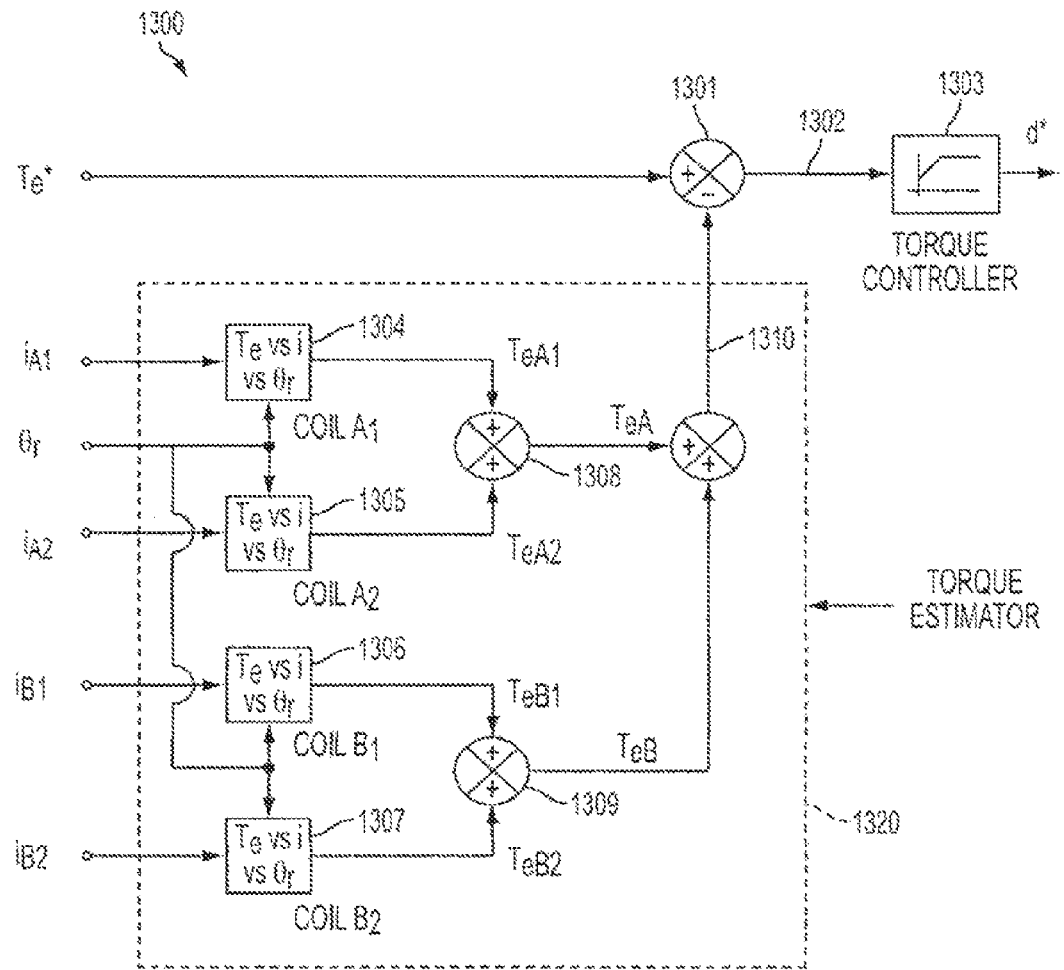
FIG. 13 illustrates the implementation in block diagram form of control system 4.

FIG. 13 illustrates the implementation 1300 of control system 4 in block diagram form. Phase A torque is the sum 1308 of the torques produced by coils $A_1$ 104 and $A_2$ 105, and similarly phase B torque is the sum 1309 of the torques produced by coils $B_1$ 106 and $B_2$ 107. The sum of the torques produced by phases A and B constitutes the air gap torque of the machine 1310 at a given instant, which is then compared with the torque command in a summer 1301. The torque command in a speed controlled drive system can be derived from speed error as shown in 1000, 1100, 1200. The torque estimator can be easily realized, based on the schematic, using a digital signal processor. The duty cycle command there is implemented for each PWM cycle as discussed elsewhere.

Figure 14:
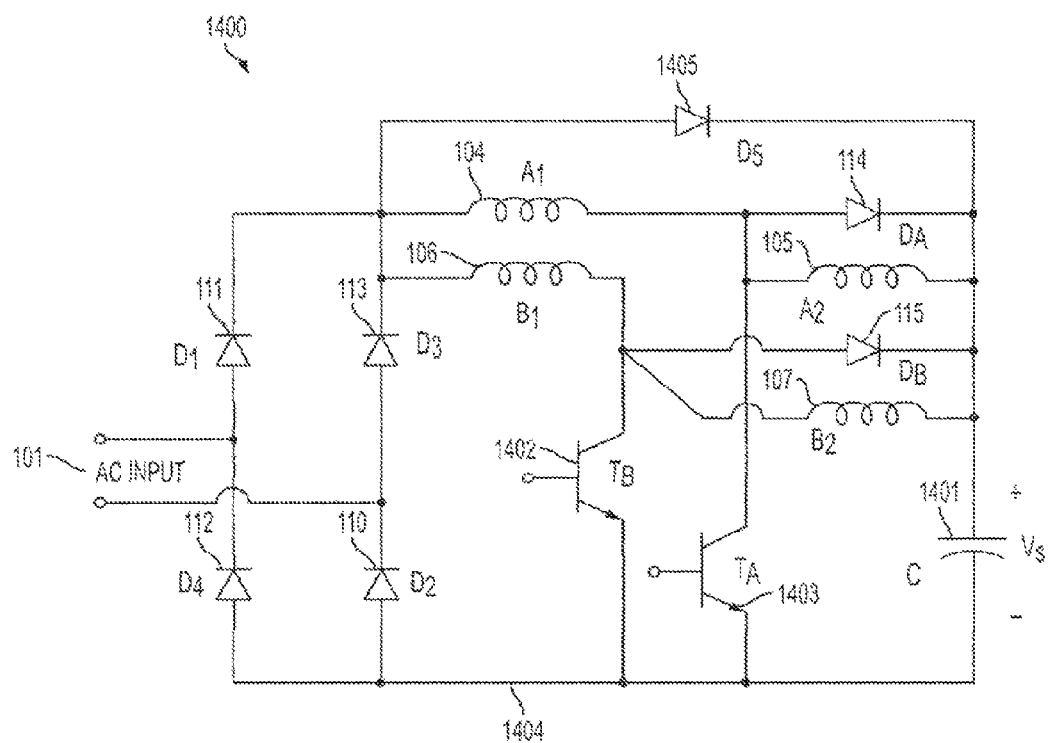
FIG. 14 illustrates an alternative realization of the invented converter in FIG. 1.

FIG. 14 illustrates an alternative realization 1400 of the converter illustrated in FIG. 1. In system 1400, only one capacitor 1401 is required opposed to two in system 100. Coils $A_1$ 104 and $B_1$ 106 can be activated regardless of whether ac input voltage 101 is going through a positive or negative half cycle. In system 100, $A_1$ 104 and $B_1$ 106 could be activated in positive and negative half cycles of supply input 101. All the emitters of transistors 1402, 1403 are commonly tied to rail 1404, resulting in no isolation required from their gate drives and, hence, in the elimination of one isolated power supply. A diode D5 1405 allows capacitor 1401 to be charged by the ac source 101 when its voltage is lower than the instantaneous magnitude of ac supply 101.

Figure 15:
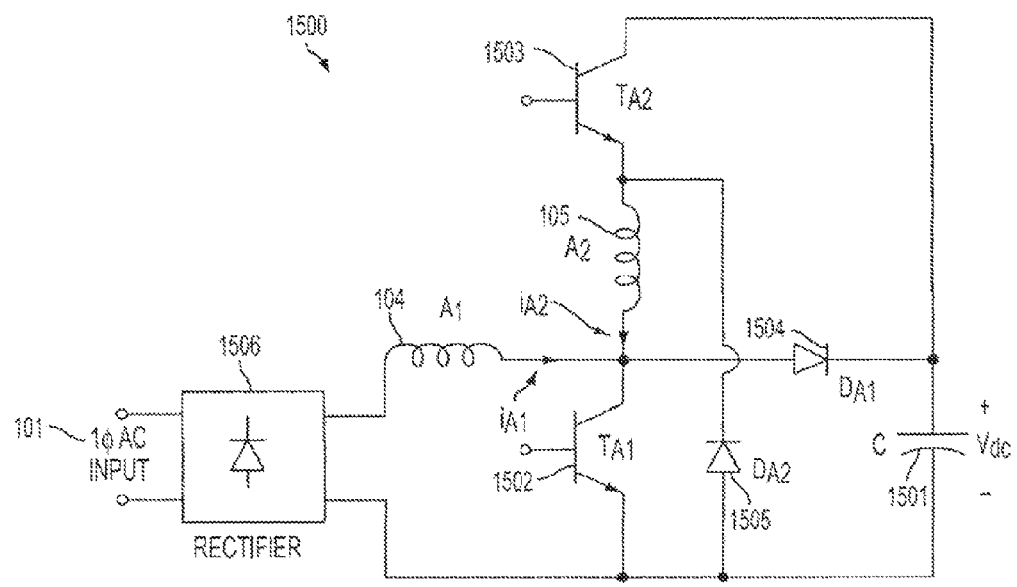
FIG. 15 illustrates a circuit with power factor correction for single phase SRM.

An alternate realization of the circuit in FIG. 14 is the circuit 1500 in FIG. 15 for a single phase SRM with a two part winding. The two coils of the single phase SRM's phase winding are coil $A_1$ 104 and coil $A_2$ 105. Only one capacitor 1501 is required to implement circuit 1500's realization. Diodes 111, 112, 113, 114 arranged in circuit 1400 form a single phase rectifier, which is rectifier 1506 in circuit 1500. The merits of the converter 1500 are: (i) it is capable of power factor correction; (ii) it can draw sinusoidal ac input current by switching on and off transistor $T_{A1}$ 1504; (iii) no external inductor is required for power factor correction; (iv) an inductor for boost operation comes from part of the phase winding, 104, resulting in: (a) compactness and (b) use of inductor 104 to produce torque while serving to boost and draw sinusoidal ac input current for power factor correction; and (v) part of the phase winding, i.e., coil $A_2$ 105, is used by turning on transistor $T_{A2}$ 1503 to use the energy stored in capacitor 1501, resulting in more torque generation. Freewheeling of $i_{A2}$ is achieved by turning off transistor $T_{A1}$ 1502 ($TA_2$ 1503 on) or vice versa. Turning off both transistors $T_{A1}$ 1502 and $T_{A2}$ 1503 applies $-V_{dc}$ across A2 105, resulting in faster decay of current $i_{A2}$.

Various control strategies are possible with circuit 1500. Circuit 1500 can be modified for a two phase SRM. By duplicating transistors 1502, 1503 and diodes 1504, 1505, which are connected to the phase A coils in circuit 1500, a second phase can be connected to the converter to drive a two phase SRM.

Figure 16:
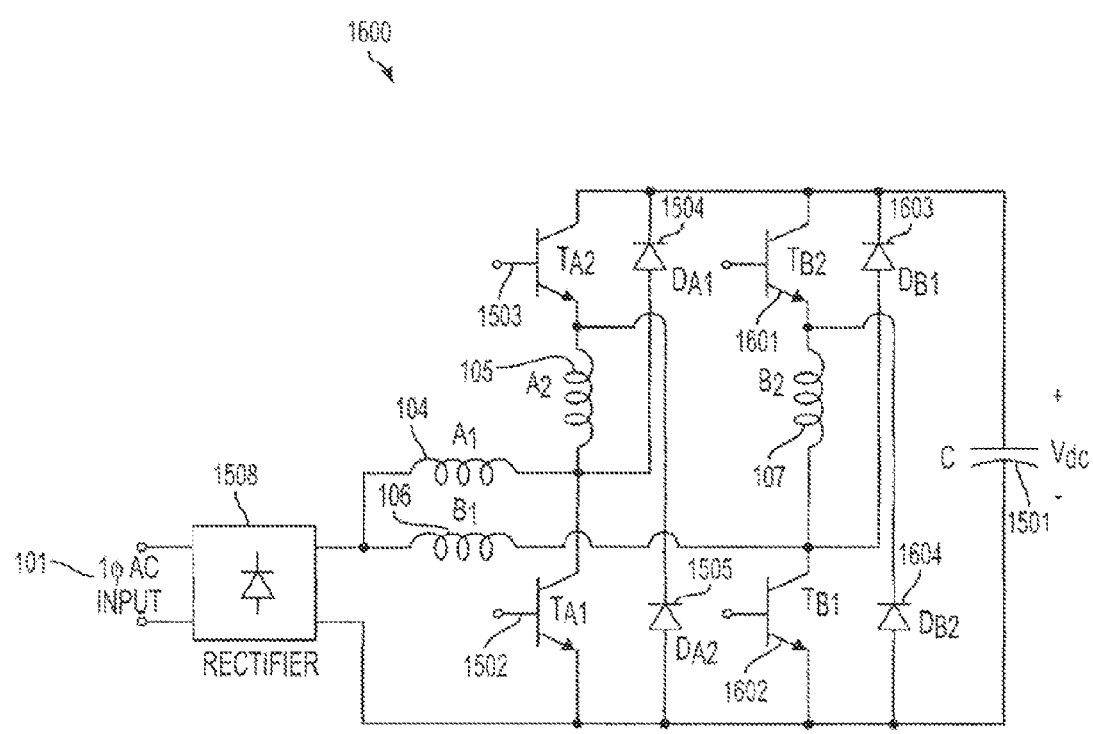
FIG. 16 illustrates a circuit with power factor correction derived from the converter in FIG. 15, for a two phase SRM with two part windings in each phase.

FIG. 16 illustrates a circuit 1600 with power factor correction derived from the converter in FIG. 15, for a two phase SRM with two part windings in each phase. In FIG. 16, transistors 1601, 1602 and diodes 1603, 1604 drive phase B coils in the same manner as phase A coils are driven in circuit 1500. Independent control of phase A and phase B currents are possible with circuit 1600.

Figure 17:
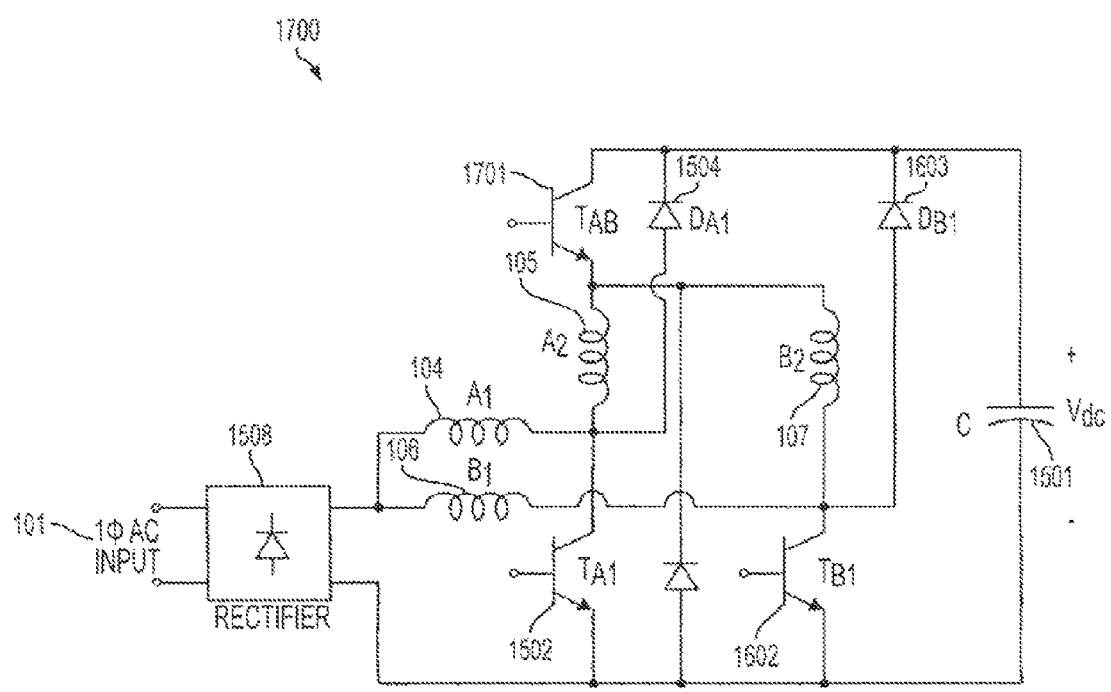
FIG. 17 illustrates a circuit with power factor correction derived from converter in FIG. 15 with reduced number of switches for a two phase SRM.

FIG. 17 illustrates a two-phase SRM circuit 1700 with power factor correction and a reduced number of switches. Circuit 1700 is derived by replacing transistors 1503, 1601 in circuit 1600 with one transistor 1701. Only three transistors are required to drive a three-phase SRM and perform power factor correction. The demerit of using reduced transistor circuit 1700 is that independent control of currents in $A_2$ 105 and $B_2$ 107 is compromised to a degree, compared to circuit 1600. The demerit of using reduced transistor circuit 1700 can be overcome by turning off current in coil $A_2$ 105 and then energizing coil $B_2$ 107. Overcoming the demerit of using reduced transistor circuit 1700 does not prevent control of currents in coils $A_1$ 104 and $B_1$ 106 to be independent of each other.

Figure 18:
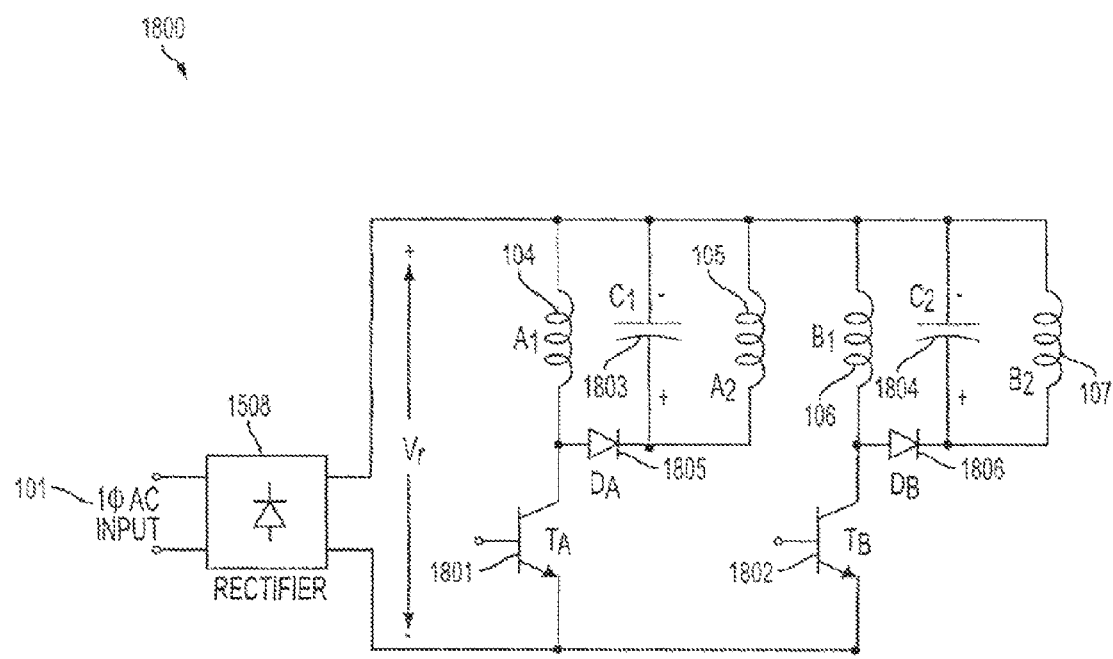
FIG. 18 illustrates a circuit for power factor correction and drive for a two phase SRM with single switch per phase.

FIG. 18 illustrates a circuit 1800 for power factor correction and drive of a two-phase SRM with a single switch per phase. Transistor 1801 drives coil $A_1$ 104 and transistor 1802 drives coil $B_1$ 106. Coils $A_2$ 105 and $B_2$ 107 are energized by energy stored in the two small capacitors $C_1$ 1803 and $C_2$ 1804, respectively. The energy stored in coils 104, 106 is used to boost capacitors 1803, 1804 respectively. Coils $A_1$ 104 and $B_1$ 106 are opposed by voltages in $C_1$ 1803 and $C_2$ 1806, respectively, that turn off current in the coils resulting in faster decay of currents in them. Limited energy in $C_1$ 1803 and $C_2$ 1804 allows for faster decay of currents in $A_2$ 105 and $B_2$ 107, respectively. Transistors $T_A$ 1801 and $T_B$ 1802 have common emitters, thus removing the need for an isolated power supply for their gate drives. The currents in $A_1$ 104 and $B_1$ 106 can be sensed inexpensively with a sensing resistor placed between the transistor emitter and the common of the dc rectified terminals with voltage, $v_r$.

An SRM with split coils in the phase windings to be used for power factor correction has been discussed extensively. Many novel arrangements of windings coils are possible to enable employment of one of power factor correction circuits in FIGS. 1 and 14-18. Some applicable SRM winding configurations are presented in FIGS. 3, 4 and 6 of U.S. Provisional Patent Application Ser. No. 60/955,661 by the same inventor Krishnan Ramu titled Power Factor Correction for Switched Reluctance Machines. U.S. Provisional Patent Application Ser. No. 60/955,661 demonstrated putting coils on the back iron of a machine with no flux reversals in any segment of the back iron.

Figure 19:
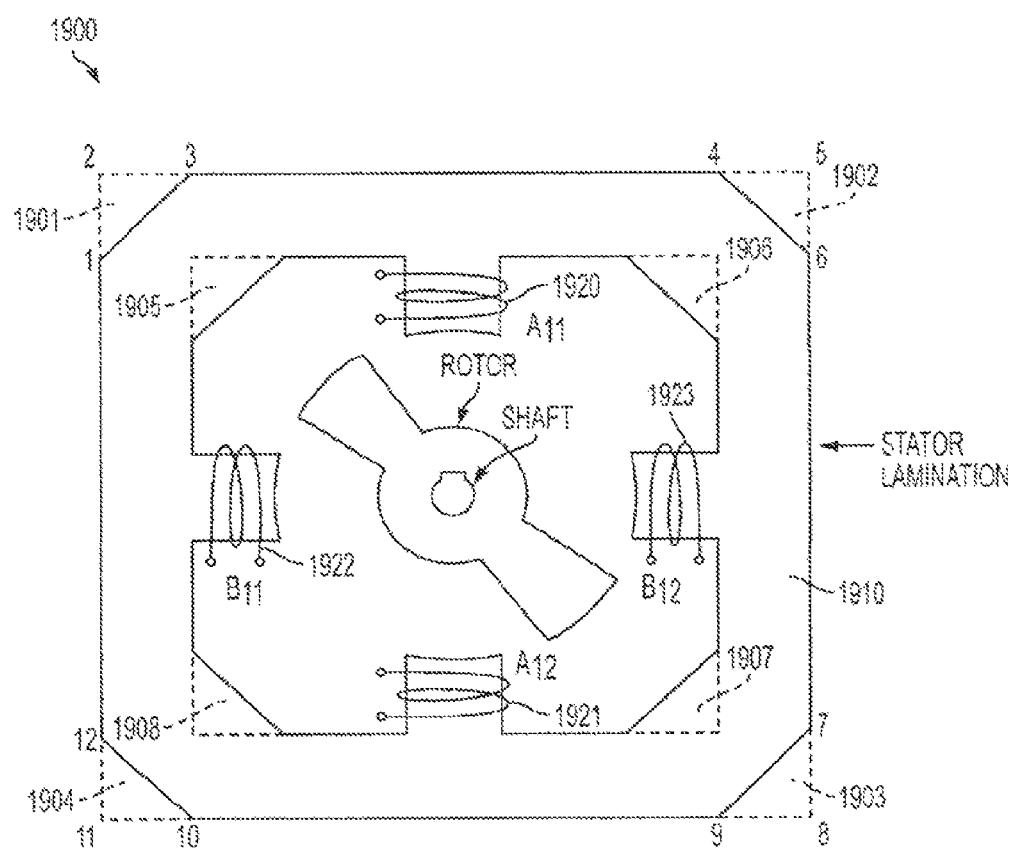
FIG. 19 illustrates a conventional 4/2 SRM with phase windings on the back iron for power factor correction.
Figure 20:
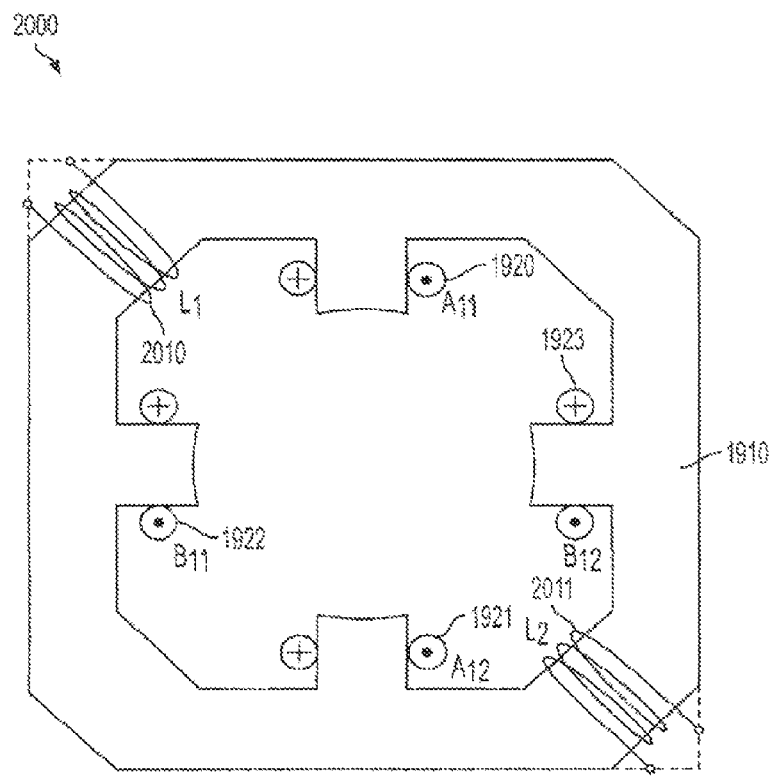
FIG. 20 illustrates a 4/2 SRM lamination.

A conventional two phase SRM that has a flux reversal in the back iron can be modified by the technique illustrated FIGS. 19 and 20. A two phase 4/2 SRM has been chosen for description and can be extended to any number of stator and rotor pole combinations. The stator of a 4/2 SRM has four salient poles, and the rotor has two salient poles. A two-phase 4/2 SRM has windings placed on the back iron where the flux does not reverse. The phase winding coils are arranged such that these windings are contained within the outer dimensions of the stator laminations. FIG. 19 shows the stator lamination with phase windings 1920, 1921, 1922, and 1923.

A machine 1900 has triangular sections (1,2,3) 1901, (4,5,6) 1902, (7,8,9) 1903, (10,11,12) 1904 in the stator lamination. For simpler punching, the corners of stator laminations may be a little rounded. Triangles 1901, 1902, 1903, 1904 are punched out from the outer edge of stator lamination 1910 to make room for windings to sit on.

For the winding to sit on the inside, correspondingly triangles 1905, 1906, 1907, 1908 are added and made to be straight-lined for the winding base to sit on. Then, the winding is designed to fit in areas 1902, 1903, 1904 assuming those sections of back iron do not see a flux reversal. When windings sit in areas 1902, 1903, 1904, triangle areas 1905, 1906, 1907, 1908 are not utilized. Iron is added to triangle areas 1905, 1906, 1907, 1908 for machine symmetry. Therefore, the final machine 2000 with back iron windings and stator lamination is shown in FIG. 20.

$L_1$ and $L_2$ are arranged in such a way that flux produced by them are in the same direction as the flux that would be made by coils $A_{11}$ 1920 and $A_{12}$ 1921 and coils $B_{11}$ 1922 and $B_{12}$ 1923. For the excitation shown for phase A (with windings $A_{11}$ 1920 and $A_{22}$ 1921) and for phase B (with windings $B_1$ 1922 and $B_2$ 1923), the flux in back iron portions between $A_{11}$ 1920 and $B_{11}$ 1922 is clockwise and between $A_{12}$ 1921 and $B_{12}$ 1923 is counterclockwise. Coils $L_1$ 2010 and $L_2$ 2011 are fixed in the corners without exceeding the outer square (or rectangular) periphery of the stator lamination 1910, to ensure no additional space is occupied by the stator coils.

Figure 21A:
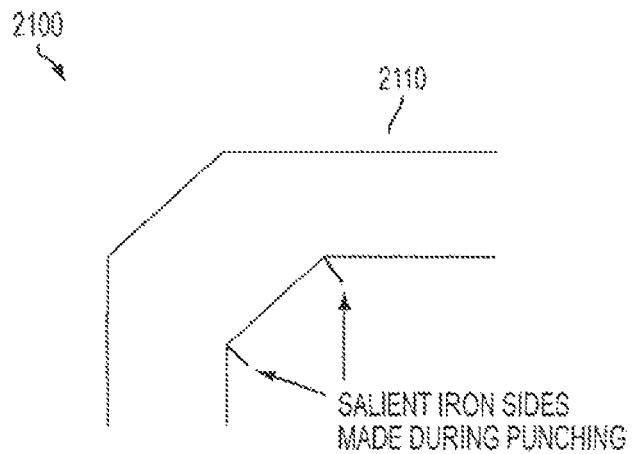
FIG. 21(a) illustrates a method to prevent the windings on the back iron by salient features on the outside of the stator lamination.
Figure 21B:
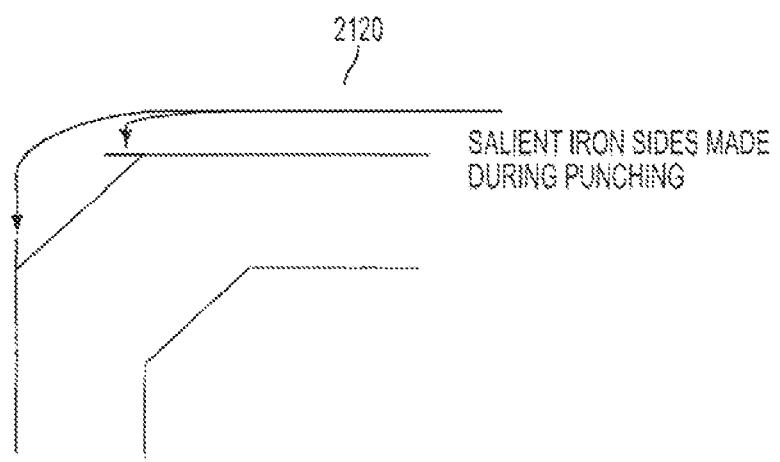
FIG. 21(b) illustrates methods to prevent the windings on the back iron by salient features on the inside of the lamination.

For coils $L_1$ 2010 and $L_2$ 2011 not to slide or move, many arrangements are possible, such as tying or gluing them. The coil arrangements 2110 and 2120 shown in FIG. 21 leave salient side iron at the bottom or top of the stator.

What is claimed is:

1. A power converter for supplying power to a motor, the power converter comprising for a phase of the motor:
   a unidirectional current element that conveys current in a single direction;
   first and second series-connected windings for the motor phase;
   a capacitive element; and
   first and second switches that each conducts current when activated and does not conduct current when deactivated, wherein:
   the unidirectional current element, capacitive element, first and second windings, and first and second switches are interconnected such that when interconnected with a single-phase alternating current supply through a full-wave bridge rectifier:
   a first operational mode of the power converter exists in which current is conducted through the first switch and the first winding, the conduction of current through the first winding imparting a motive force upon a rotor of the motor,
   a second operational mode of the power converter exists in which current is not conducted through the first switch and energy is transferred from the first winding to the capacitive element by the conduction of current through the first winding, the unidirectional current element, and the capacitive element, and
   a third operational mode exists in which energy stored in the capacitor during the second operational mode is discharged by the conduction of current through the first and second switches, capacitive element, and second winding, the conduction of current through the second winding imparting a motive force upon the motor rotor.

2. A power converter for supplying power to a motor, the power converter comprising for two phases of the motor:
   no more than three diodes;
   a single capacitor; and
   no more than three switches that each conducts current when activated and does not conduct current when deactivated, wherein:
   the three diodes, capacitor, and three switches are interconnected such that when interconnected with a single-phase alternating current supply through a full-wave bridge rectifier, first and second series-connected windings for a first of the two motor phases, and third and fourth series-connected phase windings for a second of the two motor phases:
   a first operational mode of the power converter exists in which current is conducted through a first of the three switches and the first winding, but no current is conducted through a second of the three switches,
   a second operational mode of the power converter exists in which current is conducted through the second switch and the second winding, but no current is conducted through the first switch,
   a third operational mode exists in which energy stored in the first winding during the first operational mode is discharged into the capacitor by the conduction of current through the first winding, a first of the three diodes, and the capacitor,
   a fourth operational mode exists in which energy stored in the second winding during the second operational mode is discharged into the capacitor by the conduction of current through the second winding, a second of the three diodes, and the capacitor,
   a fifth operational mode exists in which energy stored in the capacitor during the third or fourth operational modes is discharged by the conduction of current through the third winding, the first switch, and a third of the three switches, and
   a sixth operational mode exists in which energy stored in the capacitor during the third or fourth operational modes is discharged by the conduction of current through the fourth winding and the second and third switches.

3. The power converter of claim 2, further comprising:
the first and second series-connected windings and the third and fourth series-connected windings, wherein
the conduction of current through each of the first, second, third, and fourth windings imparts a motive force upon a rotor of the motor.

4. A power converter for supplying power to a motor, the power converter comprising:
a capacitive element; and
first, second, and third switches that each conducts current in a conductive state and does not conduct current in a non-conductive state, wherein:
the capacitive element and first, second, and third switches are interconnected such that when interconnected with a single-phase alternating current supply, through a full-wave bridge rectifier, first and second series-connected windings constituting a first phase of the motor, and third and fourth series-connected windings constituting a second phase of the motor:
energy is transferred from the current supply to the first winding, by the conveyance of current through the first switch and first winding, when the first switch is in the conductive state,
energy stored in the first winding is transferred to the capacitive element, by the conveyance of current through the first winding and capacitive element, when the first switch is in the non-conductive state,
energy stored in the capacitive element is transferred to the second winding, by the conveyance of current through the first and second switches and the second winding, when the first and second switches each are in the conductive state,
energy is transferred from the current supply to the third winding, by the conveyance of current through the third switch and third winding, when the third switch is in the conductive state,
energy stored in the third winding is transferred to the capacitive element, by the conveyance of current through the third winding and the capacitive element, when the third switch is in the non-conductive state, and
energy stored in the capacitive element is transferred to the fourth winding, by the conveyance of current through the second and third switches, the fourth winding and the capacitive element, when the second and third switches each are in the conductive state.

5. The power converter of claim 4, further comprising:
a first unidirectional current element that conducts current in a single direction, wherein:
the first unidirectional current element, capacitive element, and first, second, and third switches are interconnected such that when interconnected with the single-phase alternating current supply, through the full-wave bridge rectifier, and the first, second, third, and fourth windings:
the energy stored in the first winding is transferred to the capacitive element, by the conveyance of current through the first winding, first unidirectional current element and capacitive element, when the first and second switches each are in the non-conductive state.

6. The power converter of claim 5, further comprising:
a second unidirectional current element that conducts current in a single direction, wherein:
the first and second unidirectional current elements, capacitive element, and first, second, and third switches are interconnected such that when interconnected with the single-phase alternating current supply, through the full-wave bridge rectifier, and the first, second, third, and fourth windings:
energy stored in the third winding is transferred to the capacitive element, by the conveyance of current through the third winding, second unidirectional current element and capacitive element, when the third switch is in the non-conductive state.

7. The power converter of claim 6, further comprising:
a third unidirectional current element that conducts current in a single direction, wherein:
the first, second, and third unidirectional current elements, capacitive element, and first, second, and third switches are interconnected such that when interconnected with the single-phase alternating current supply, through the full-wave bridge rectifier, and the first, second, third, and fourth windings:
energy stored in the second winding is discharged by the conduction of current through the second winding, third unidirectional current element and first switch, when the first switch is in the conductive state and the second switch is in the non-conductive state, and
energy stored in the fourth winding is discharged by the conduction of current through the fourth winding, third unidirectional current element and third switch, when the third switch is in the conductive state and the second switch is in the non-conductive state.

8. The power converter of claim 4, further comprising:
first, second, and third unidirectional current elements that each conducts current in a single direction, wherein:
the first, second, and third unidirectional current elements, capacitive element, and first, second, and third switches are interconnected such that when interconnected with the single-phase alternating current supply through the full-wave bridge rectifier and the first, second, third, and fourth windings:
energy stored in the second winding is transferred to the capacitive element, by the conveyance of current through the second winding, first and second unidirectional current elements and capacitive element, when the first and second switches each are in the non-conductive state, and
energy stored in the fourth winding is transferred to the capacitive element, by the conveyance of current through the fourth winding, second and third unidirectional current elements and capacitive element, when the second and third switches each are in the non-conductive state.

9. The power converter of claim 8, wherein:
energy stored in the first winding is transferred to the capacitive element, by the conveyance of current through the first winding, first unidirectional current element and capacitive element, when the first and second switches each are in the non-conductive state, and
energy stored in the third winding is transferred to the capacitive element, by the conveyance of current through the third winding, third unidirectional current element and capacitive element, when the second and third switches each are in the non-conductive state.

10. A power converter for supplying power to a motor, the power converter comprising:
first and second unidirectional current elements that each conducts current in a single direction;
first and second capacitive elements; and first and second switches that each conducts current in a conductive state and does not conduct current in a non-conductive state, wherein:

the first and second unidirectional current elements, first and second capacitive elements, and first and second switches are interconnected such that when interconnected with a single-phase alternating current supply through a full-wave bridge rectifier, first and second windings constituting a first motor phase, and third and fourth windings constituting a second motor phase:

energy is transferred from the current supply to the first winding, by the conveyance of current through the first switch and first winding, when the first switch is in the conductive state, energy stored in the first winding is transferred to the first capacitive element, by the conveyance of current through the first winding, first unidirectional current element and first capacitive element, when the first switch is in the non-conductive state, energy stored in the first capacitive element is transferred to the second winding, by the conveyance of current through the first capacitive element and second winding, energy is transferred from the current supply to the third winding, by the conveyance of current through the second switch and third winding, when the second switch is in the conductive state, energy stored in the third winding is transferred to the second capacitive element, by the conveyance of current through the third winding, second unidirectional current element and second capacitive element, when the second switch is in the non-conductive state, and energy stored in the second capacitive element is transferred to the fourth winding, by the conveyance of current through the second capacitive element and fourth winding.

11. The power converter of claim 10, wherein the first capacitive element and second winding are electrically connected in parallel such that the same voltage potential exists across the first capacitive element and second winding.

12. The power converter of claim 11, wherein the second capacitive element and fourth winding are electrically connected in parallel such that the same voltage potential exists across the first capacitive element and second winding.

13. The power converter of claim 10, wherein a series connection of the first winding and first unidirectional current element is electrically connected in parallel with the first capacitive element such that the same voltage potential exists across the first capacitive element and the series connection of the first winding and first unidirectional current element.

14. The power converter of claim 13, wherein a series connection of the third winding and second unidirectional current element is electrically connected in parallel with the second capacitive element such that the same voltage potential exists across the second capacitive element and the series connection of the third winding and second unidirectional current element.

15. A power converter comprising:
first, second, and third unidirectional current elements that each conducts current in only one direction between a current input terminal and a current output terminal;
a capacitive element for storing energy across first and second terminals; and
first, second, and third switches that each conducts current between a current input terminal and a current output terminal when in a conductive state and does not conduct current when in a non-conductive state, wherein:

the first terminal of the capacitive element, the current input terminal of the second switch, and the current output terminals of the first and third unidirectional current elements are directly connected by a first node, the current input terminal of the first unidirectional current element is directly connected to the current input terminal of the first switch by a second node, the current output terminal of the second switch is directly connected to the current output terminal of the second unidirectional current element by a third node, the second terminal of the capacitive element is directly connected to the current output terminals of the first and third switches, and the current input terminal of the second unidirectional current element by a fourth node, and the current input terminals of the third switch and the third unidirectional current element are directly connected by a fifth node.

16. The power converter of claim 15, further comprising:
first and second motor windings, wherein:
the first winding has a terminal directly connected to the second node, and
the second winding has a terminal directly connected to the second node and another terminal directly connected to the third node.

17. The power converter of claim 15, further comprising:
first, second, third and fourth motor windings, wherein:
the first winding has a terminal directly connected to the second node,
the second winding has a terminal directly connected to the second node and another terminal directly connected to the third node,
the third winding has a terminal directly connected to the fifth node, and
the fourth winding has a terminal directly connected to the third node and another terminal directly connected to the fifth node.

18. The power converter of claim 15, further comprising:
a fourth unidirectional current element that conducts current in only one direction between a current input terminal and a current output terminal; and
a fourth switch that conducts current between a current input terminal and a current output terminal when in a conductive state and does not conduct current when in a non-conductive state, wherein:

the current input terminal of the fourth switch is directly connected to the first node, the current input terminal of the fourth unidirectional current element is directly connected to the fourth node, and the current output terminals of the fourth switch and fourth unidirectional current element are directly connected by a sixth node.

19. The power converter of claim 18, further comprising:
first, second, third and fourth motor windings, wherein:
the first winding has a terminal directly connected to the second node,
the second winding has a first terminal directly connected to the second node and a second terminal directly connected to the third node,
the third winding has a terminal directly connected to the fifth node, and
the fourth winding has a first terminal directly connected to the fifth node and a second terminal directly connected to the sixth node.

20. A power converter comprising:
first and second unidirectional current elements that each conducts current in only one direction between a current input terminal and a current output terminal;
first and second capacitive elements that each stores energy across first and second terminals;
first and second switches that each conducts current between a current input terminal and a current output terminal when in a conductive state and does not conduct current when in a non-conductive state;
first and second motor windings constituting a first motor phase, each of the first and second windings having first and second terminals;
third and fourth motor windings constituting a second motor phase, each of the third and fourth windings having first and second terminals, wherein:
the first terminals of the first and second capacitive elements and the first terminals of the first, second, third, and fourth windings are directly connected by a first node,
the second terminal of the first winding and the current input terminals of the first switch and first unidirectional current element are directly connected by a second node,
the second terminals of the first capacitive element and the second winding and the current output terminal of the first unidirectional current element are directly connected by a third node,
the second terminal of the third winding and the current input terminals of the second switch and second unidirectional current element are directly connected by a fourth node,
the second terminals of the second capacitive element and the fourth winding and the current output terminal of the second unidirectional current element are directly connected by a fifth node, and
the current output terminals of the first and second switches are directly connected by a sixth node.

21. A power converter for supplying power to a motor, the power converter comprising:
a capacitive element; and
first, second, third, and fourth switches that each conducts current in a conductive state and does not conduct current in a non-conductive state, wherein:
the capacitive element and first, second, third, and fourth switches are interconnected such that when interconnected with a single-phase alternating current supply, through a full-wave bridge rectifier, first and second series-connected windings constituting a first phase of the motor, and third and fourth series-connected windings constituting a second phase of the motor:
energy is transferred from the current supply to the first winding, by the conveyance of current through the first switch and first winding, when the first switch is in the conductive state,
energy stored in the first winding is transferred to the capacitive element, by the conveyance of current through the first winding and capacitive element, when the first switch is in the non-conductive state,
energy stored in the capacitive element is transferred to the second winding, by the conveyance of current through the first and second switches and the second winding, when the first and second switches each are in the conductive state, energy is transferred from the current supply to the third winding, by the conveyance of current through the third switch and third winding, when the third switch is in the conductive state,
energy stored in the third winding is transferred to the capacitive element, by the conveyance of current through the third winding and the capacitive element, when the third switch is in the non-conductive state, and
energy stored in the capacitive element is transferred to the fourth winding, by the conveyance of current through the third and fourth switches, the fourth winding and the capacitive element, when the third and fourth switches each are in the conductive state.

22. The power converter of claim 21, further comprising:
first, second, third, and fourth unidirectional current elements that each conducts current in a single direction, wherein:
the first, second, third, and fourth unidirectional current elements, capacitive element, and first, second, third, and fourth switches are interconnected such that when interconnected with the single-phase alternating current supply through the full-wave bridge rectifier and the first, second, third, and fourth windings:
energy stored in the second winding is transferred to the capacitive element, by the conveyance of current through the second winding, first and second unidirectional current elements and capacitive element, when the first and second switches each are in the non-conductive state, and
energy stored in the fourth winding is transferred to the capacitive element, by the conveyance of current through the fourth winding, third and fourth unidirectional current elements and capacitive element, when the third and fourth switches each are in the non-conductive state.

23. The power converter of claim 22, wherein:
the energy stored in the first winding is transferred to the capacitive element, by the conveyance of current through the first winding, first unidirectional current element and capacitive element, when the first and second switches each are in the non-conductive state, and
the energy stored in the third winding is transferred to the capacitive element, by the conveyance of current through the third winding, third unidirectional current element and capacitive element, when the first and second switches each are in the non-conductive state.

24. The power converter of claim 21, further comprising:
the first and second series-connected windings and the third and fourth series-connected windings, wherein
the conduction of current through each of the first, second, third, and fourth windings imparts a motive force upon a rotor of the motor.

* * * * *